(12) United States Patent
Roth

(10) Patent No.: US 8,348,516 B2
(45) Date of Patent: Jan. 8, 2013

(54) HIGH DENSITY FRONT PANEL OPTICAL INTERCONNECT

(75) Inventor: Richard F. Roth, Brookline, NH (US)

(73) Assignee: Amphenol Corporation, Wallingford, CT (US)

( * ) Notice: Subject to any disclaimer, the term of this patent is extended or adjusted under 35 U.S.C. 154(b) by 377 days.

(21) Appl. No.: 12/368,832

(22) Filed: Feb. 10, 2009

(65) Prior Publication Data

US 2010/0202736 A1    Aug. 12, 2010

(51) Int. Cl.
*G02B 6/36* (2006.01)
(52) U.S. Cl. ............... 385/53; 385/59; 385/55
(58) Field of Classification Search .............. 385/53–56, 385/69–73, 59, 88–90
See application file for complete search history.

(56) References Cited

U.S. PATENT DOCUMENTS

| | | | |
|---|---|---|---|
| 5,363,460 A * | 11/1994 | Marazzi et al. ................. | 385/70 |
| 5,915,058 A * | 6/1999 | Clairardin et al. .............. | 385/77 |
| 6,305,961 B1 | 10/2001 | Szilagyi et al. | |
| 6,398,422 B1 | 6/2002 | Szilagyi et al. | |
| 6,776,645 B2 | 8/2004 | Roth et al. | |
| 6,811,321 B1 | 11/2004 | Schmalzigaug et al. | |
| 6,832,858 B2 | 12/2004 | Roth et al. | |
| 6,986,607 B2 | 1/2006 | Roth et al. | |
| 7,073,953 B2 | 7/2006 | Roth et al. | |
| 7,204,016 B2 | 4/2007 | Roth et al. | |
| 7,290,941 B2 | 11/2007 | Kiani et al. | |
| 7,331,718 B2 * | 2/2008 | Yazaki et al. .................. | 385/78 |
| 7,556,438 B2 * | 7/2009 | Oike et al. ...................... | 385/78 |
| 7,712,974 B2 * | 5/2010 | Yazaki et al. .................. | 385/87 |
| 7,744,290 B2 * | 6/2010 | Yazaki et al. .................. | 385/73 |
| 2001/0048790 A1 * | 12/2001 | Burkholder et al. ........... | 385/78 |
| 2003/0147597 A1 * | 8/2003 | Duran ............................ | 385/76 |
| 2007/0082552 A1 * | 4/2007 | Feldner ........................ | 439/607 |
| 2010/0034503 A1 * | 2/2010 | Milette .......................... | 385/72 |

OTHER PUBLICATIONS

Molex Array Connector and Adapter System, Molex Fiber Optics Division, © 2002, 1 page.

* cited by examiner

*Primary Examiner* — Ellen Kim
(74) *Attorney, Agent, or Firm* — Blank Rome LLP

(57) ABSTRACT

A connector assembly has a cable assembly, plug assembly and a socket assembly. The socket assembly is a female member which is received within an opening at the front face of a panel. The plug assembly is a male member which then engages the socket at the front face of the panel. The cable assembly connects the cables carrying optical fibers to the plug assembly. As the socket assembly receives the plug assembly, doors on the respective housings open and ferrule carriers carried by the socket and plug assemblies mate. The plug assembly has a movable front end which permits the fibers to move in both horizontal and vertical directions.

19 Claims, 18 Drawing Sheets

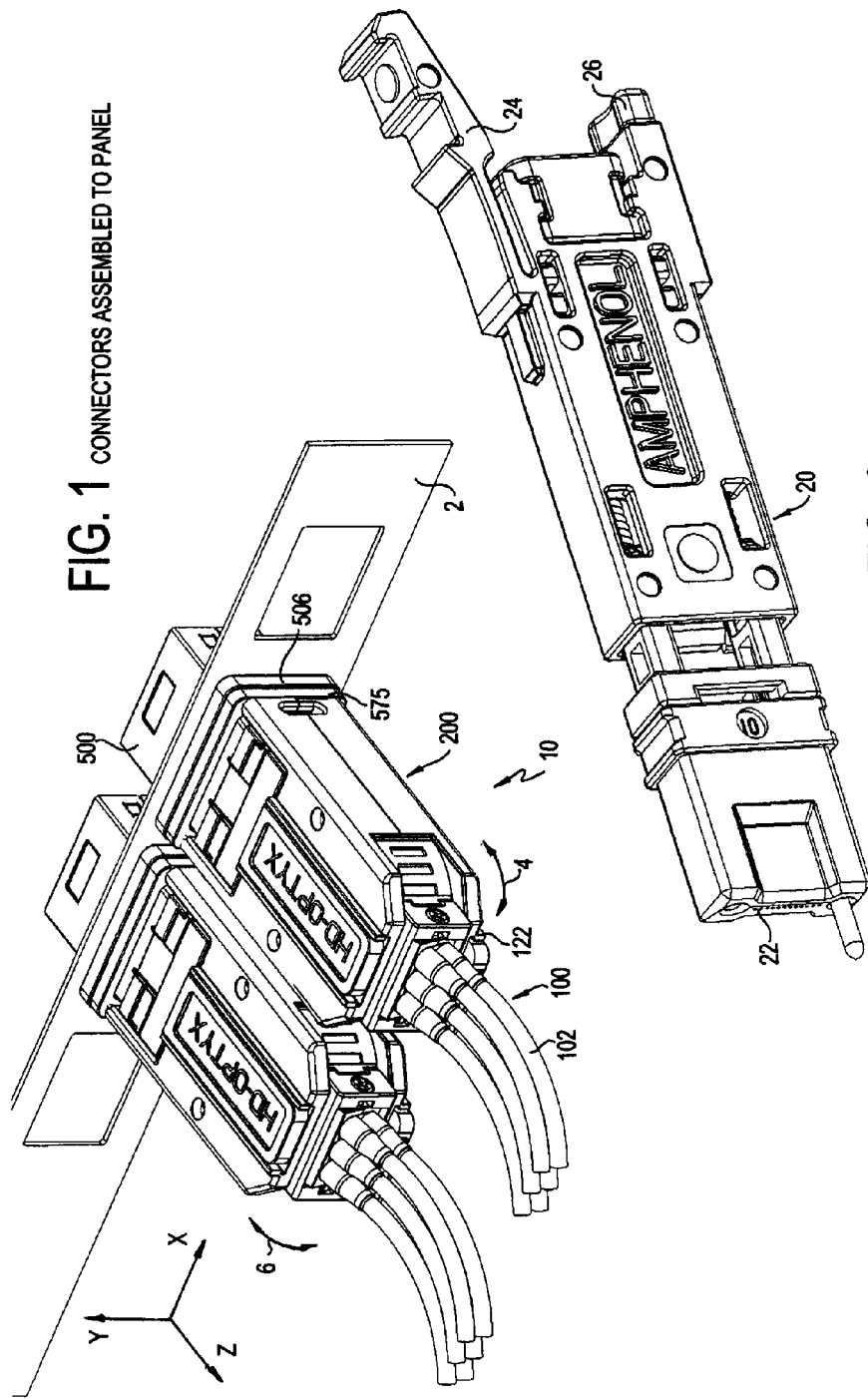
FIG. 1 CONNECTORS ASSEMBLED TO PANEL
FIG. 2 FERRULE CARRIER

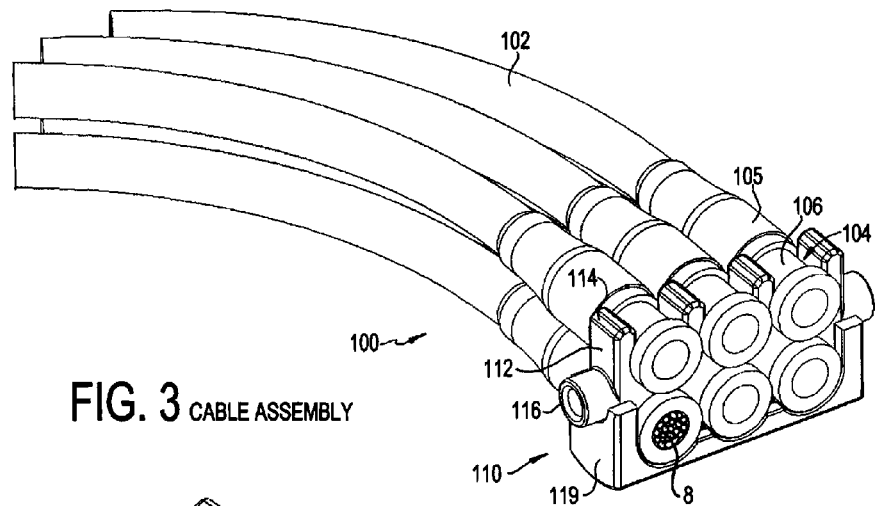
FIG. 3 CABLE ASSEMBLY
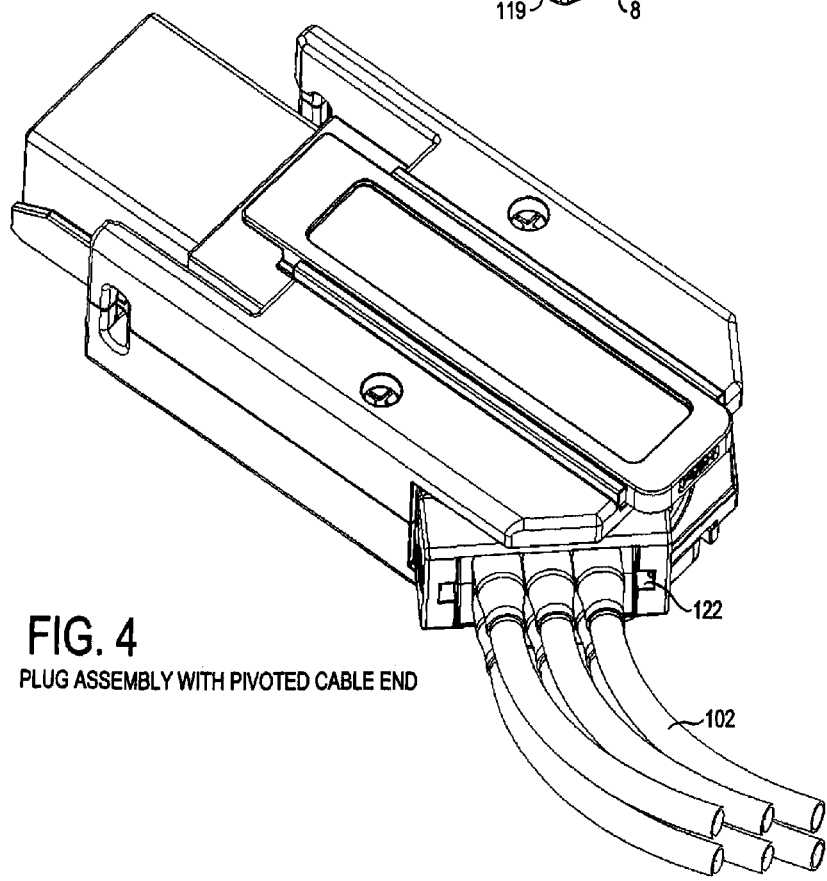
FIG. 4
PLUG ASSEMBLY WITH PIVOTED CABLE END

FIG. 5 PLUG ASSEMBLY (EXPLODED VIEW)

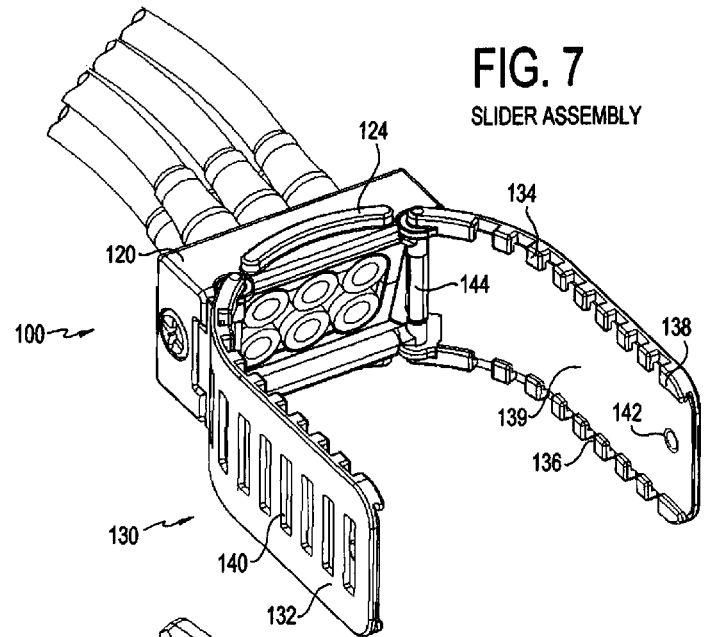
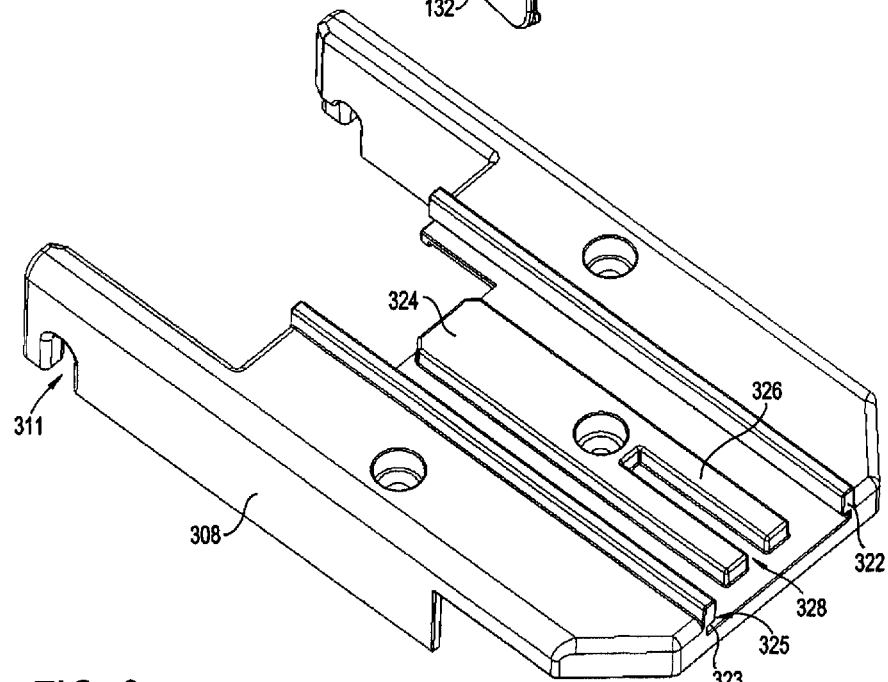

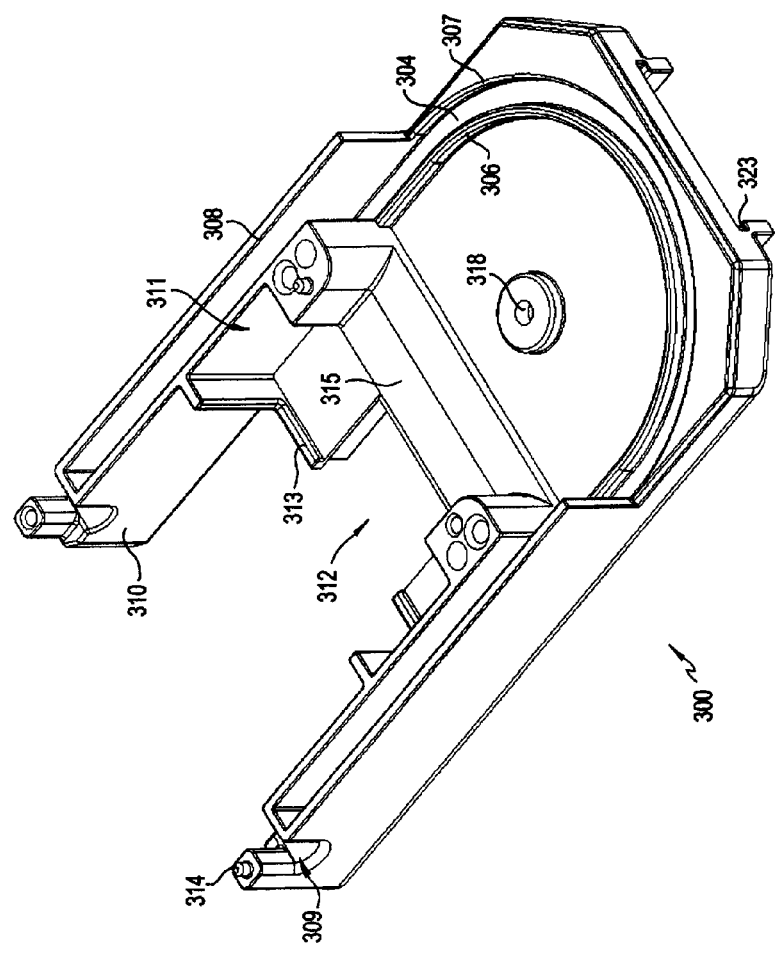
FIG. 8 PLUG COVER AND BASE (BOTTOM VIEW)

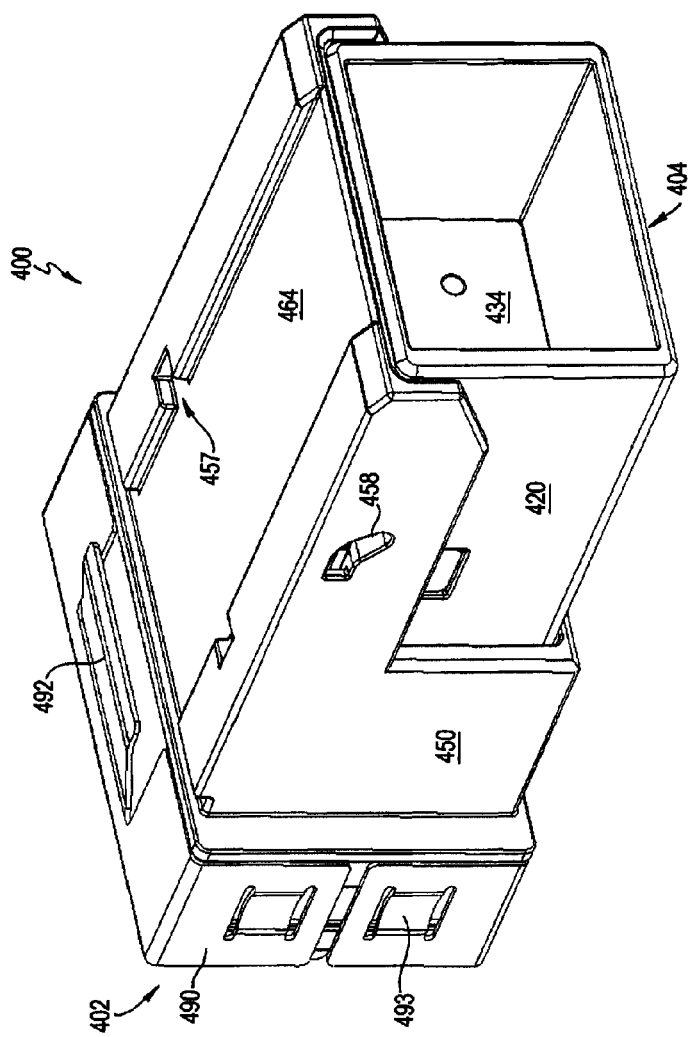
FIG. 10(a) PLUG HOUSING ASSEMBLY

INNER PLUG HOUSING PARTIAL ASSEMBLY

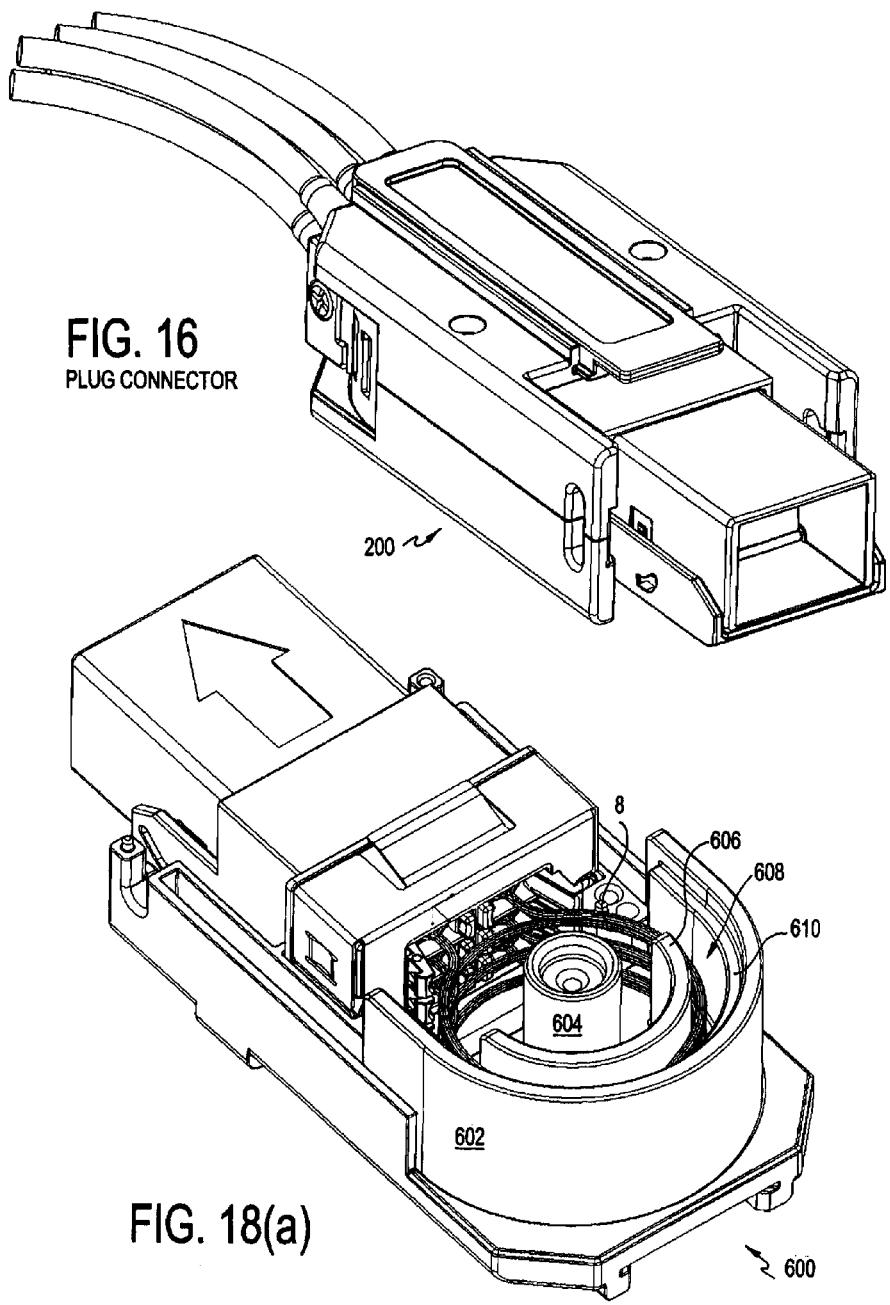

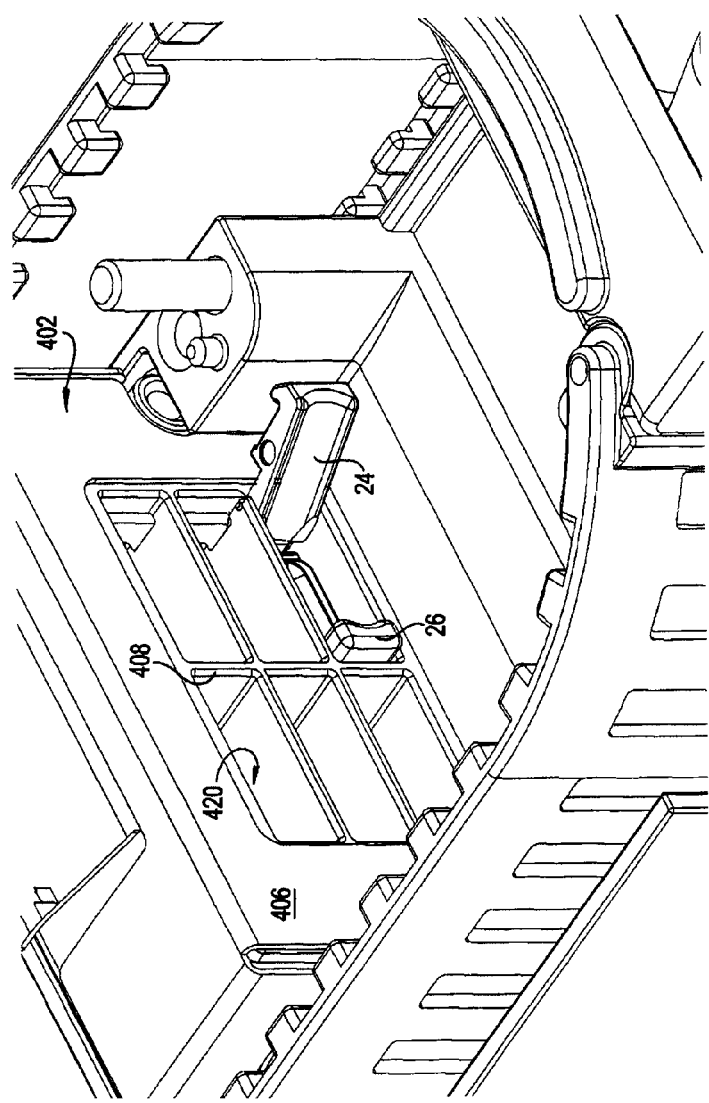
FIG. 17 PLUG CONNECTOR CAVITY

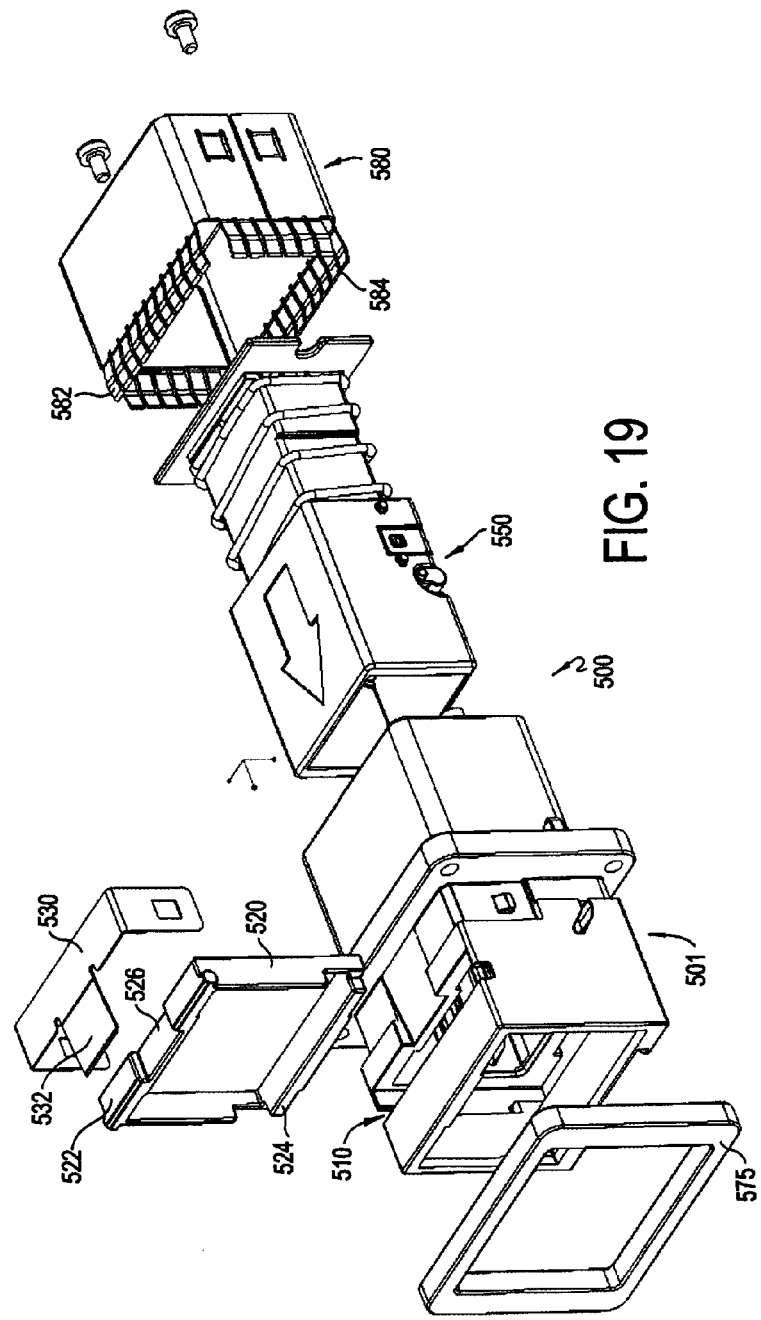

SOCKET WINDOW FRAME LOCK

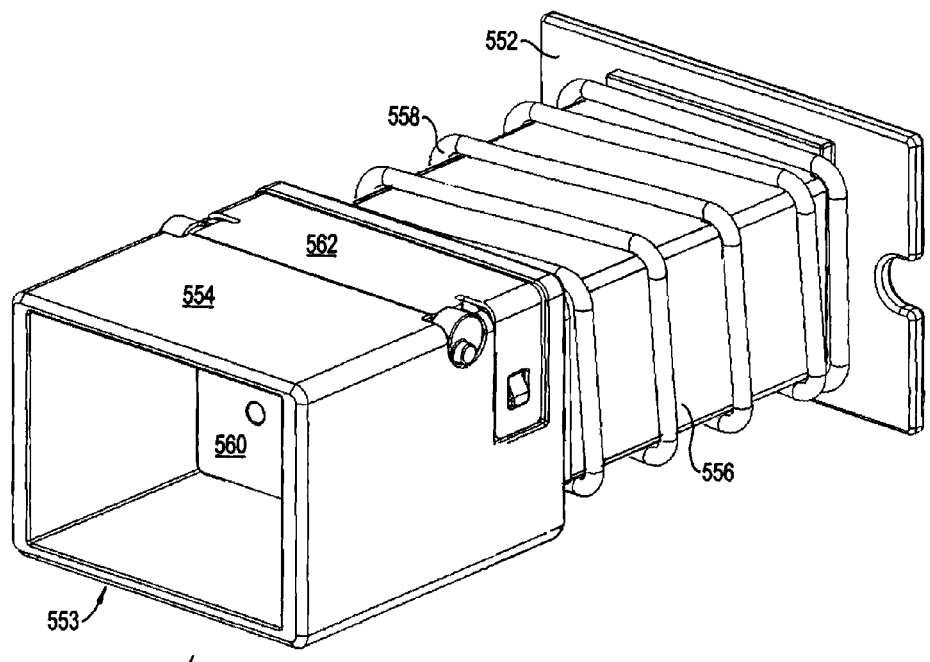
FIG. 23 INNER SOCKET DOOR ASSEMBLY
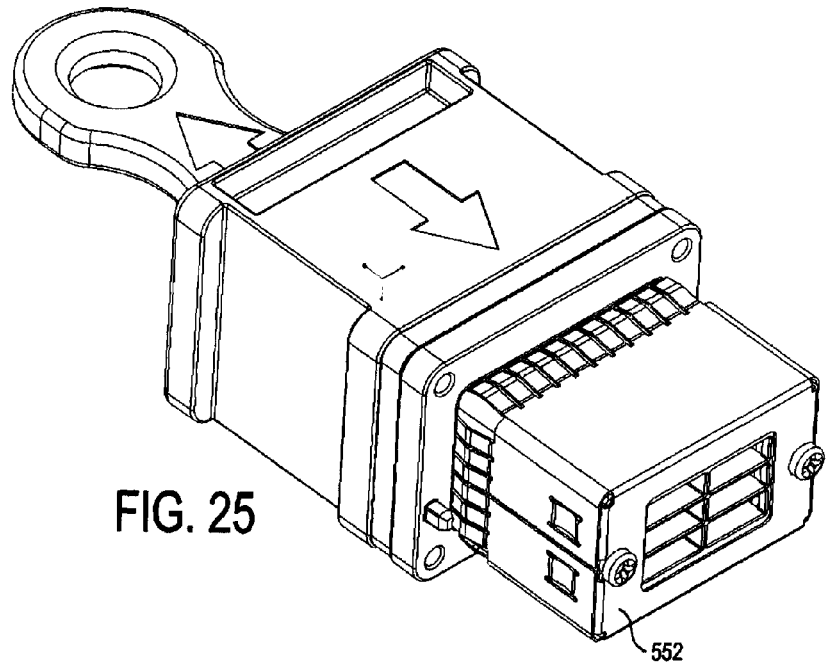
FIG. 25

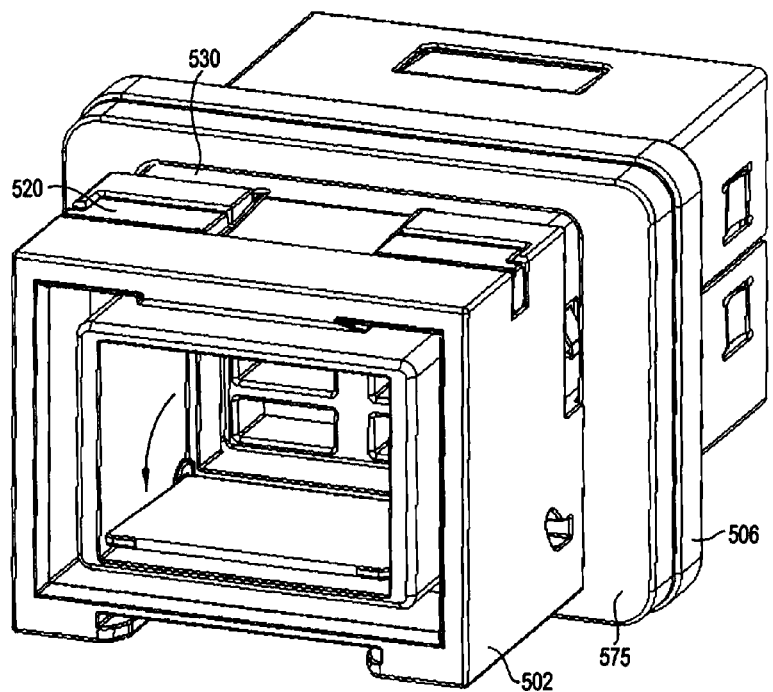
FIG. 24 SOCKET WITH DOOR OPEN
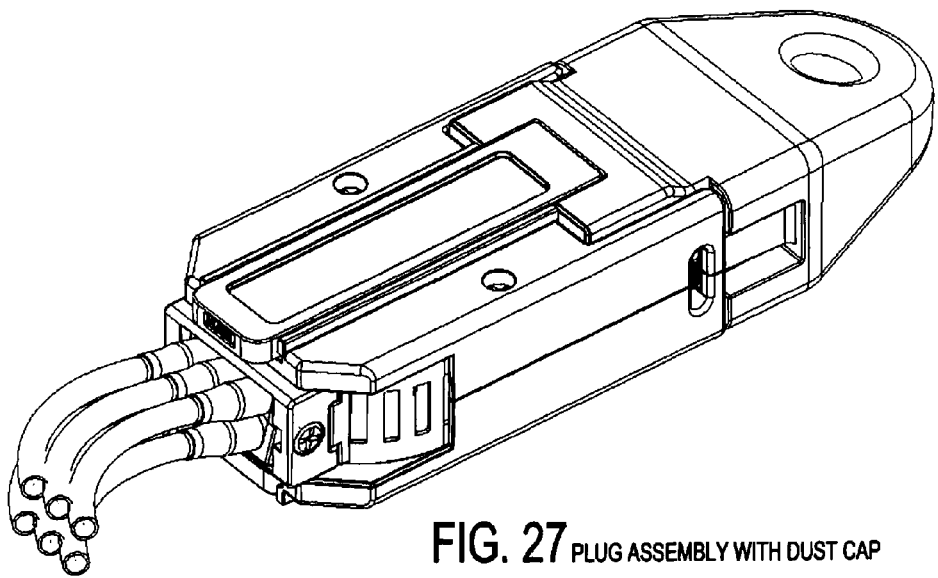
FIG. 27 PLUG ASSEMBLY WITH DUST CAP

HIGH DENSITY FRONT PANEL OPTICAL INTERCONNECT

BACKGROUND OF THE INVENTION

1. Field of the Invention

The present invention relates generally to electronic systems and more particularly to electronic systems using optical fibers to carry data between components of the system.

2. Background of the Related Art

Common examples of electronic systems are computers, routers and telecommunications switches. Complex electronic systems have long been built as subassemblies that are then integrated into an overall system. Integration requires that data be passed between subassemblies. Traditionally, integration of subassemblies has included making connections for electrical signals to carry data between the subassemblies. In some systems, printed circuit boards, sometimes called backplanes, are used to carry electrical signals between subassemblies. Backplanes are usually built as printed circuit boards. Conductive traces within the board carry electrical signals and electrical connectors attached to the board allow subassemblies to be connected to those traces.

In some instances, subassemblies are also built on printed circuit boards, called daughter cards. The conductive traces on the daughter cards interconnect electronic components mounted on the board. The traces also connect those components to connectors on the daughter card. The daughter card connectors mate with backplane connectors to allow the electronic circuitry on the daughter card to pass information in the form of electrical signals through the backplane to other subassemblies connected to the backplane. Where interconnections are made through a backplane, all of the subassemblies to be connected together are usually mounted in one housing.

In other instances, some electronic systems are made up of subassemblies that are contained in separate housings. The system might be too big to fit in a single enclosure or might require subassemblies located in physically separate locations. For example, data storage farms are made of interconnected storage units because it is likely that one unit containing all the necessary circuitry would be too large to easily fit within a single housing. Routers and switches in networks are made as separate pieces to allow the network to span a wide geographic range. A system also might be manufactured as separate components as a matter of convenience. For example, a system might be made from modules to allow systems of many different sizes to be constructed by integrating different numbers of modules.

Where systems are assembled from separate components, cables are often used to interconnect the components. Electronic components that are intended to be integrated into a much larger system often have "panels" or "bulkheads" to which cables interconnecting the subsystems can be connected.

Often, the panel on a subassembly contains electrical connectors. Inside the subassembly, these connectors might be connected to backplanes or daughter cards or otherwise tied into the system. On the outside of the subassembly, the connectors are shaped to receive connectors on the ends of cables. In this way, cables can be plugged into panels to interconnect the subassemblies.

As electronic systems became more powerful, the data rate between subassemblies increased. To carry more data, optical interconnections were often used. Rather than transmit data as electrical signals on conductors, optical interconnections transmit data as modulated light in a structure that acts as an optical waveguide—often an optical fiber. To facilitate the interconnection of subassemblies using optical fibers, optical connectors have been developed. Both backplane/daughter-card and panel type optical connectors are known.

Several problems exist with optical interconnections that do not exist with corresponding electrical connectors. One particular problem is that the optical fibers must be aligned with much higher precision than electrical conductors for optical connectors to reliably transmit signals. Alignment in optical connectors is often achieved through the use of several levels of alignment mechanisms. At the most precise level, the fiber in both halves of the connector is held in ferrules. Ferrules are precision manufactured components that contain alignment features.

Early designs used single fiber ferrules. These ferrules are generally cylindrical, with the outer surface of the cylinder being the alignment feature. Alignment of the fibers was achieved by inserting the ferrules into opposite ends of a sleeve. The sleeve was also a precision component, ensuring that the faces of the ferrules would align inside the sleeve. Often, the sleeve was incorporated into an adapter and connectors holding the ferrules were plugged into both sides of the adapter.

Multi-fiber ferrules have also been developed, such as the MT ferrule. Alignment features in these ferrules include posts and holes. The fibers held in the ferrules are aligned when the posts of one ferrule are in the holes of another ferrule. However, for the ferrules to align the fibers as two connectors are mated, the ferrules must first be aligned such that the posts engage with the holes. This level of alignment is often provided through a connector housing. The connector housings have features that, when interlocked, ensure that the ferrules will be aligned with sufficient precision.

Another level of alignment is often used to ensure the housings line up and also to hold the connectors together when mated. A device that provides this level of alignment is also called an adapter. In a simple form, an adapter can be a sleeve into which two connectors can be inserted from opposite directions. The sleeve forces the connector housings into alignment when they come together in the center of the sleeve. Latching features can be incorporated into the sleeve to hold the connector housings together.

An example of optical connector systems can be found in U.S. Pat. No. 6,305,961, filed Jul. 12, 2000, entitled "EMI Gasket for Connector Assemblies"; U.S. Pat. No. 6,832,858, filed Sep. 13, 2002, entitled "Techniques for Forming Fiber Optic Connections in an Modularized Manner"; U.S. Pat. No. 7,073,953, filed Jul. 16, 2002 entitled "Modular Fiber Optic Connection System"; U.S. Pat. No. 6,776,645 entitled "Latch and Release System for a Connector," filed on Dec. 20, 2002, by Roth, et al.; and U.S. Pat. No. 7,290,941, filed Dec. 23, 2003, entitled "Modular Fiber Optic Connector System," all of which are hereby incorporated by reference in their entireties.

However, in these systems, the exiting cables are fixed in a given orientation with respect to the entering cables and do not provide dynamic flexibility once installed. Right angle boots or radius control devices have been added to maintain a constant bend on the fiber. Although this bend control is desirable, it does pose other serious routing problems when the cables exit the connector, since it limits the available options for cable positioning on a card rack. Often these systems are tremendously cluttered with cables and there is little room to disengage or engage connectors on any given card. Furthermore, when a cable exit is fixed in one orientation this means that multiple connectors when mounted on the same card must by definition all exit in the same direction and lay one on top of another. This is very cumbersome when space is at a premium.

SUMMARY OF THE INVENTION

Accordingly, it is an object of the invention to design a shielded and shuttered connector that has a dynamic rear end. It is a further object of the invention to provide a connector assembly that has a socket which plugs into a panel and a plug that removably engages the socket. It is another object of the invention to provide a plug assembly that connects with cables and allows the cables to move in horizontal and vertical directions.

In accordance with these and other objectives, a connector assembly is provided having a cable assembly, plug assembly and a socket assembly. The socket assembly is a female member which is received within an opening at the front face of a panel, which can be a front or back panel. The plug assembly is a male member which then engages the socket at the front face of the panel. The cable assembly connects the cables carrying optical fibers to the plug assembly.

A first ferrule carrier is connected through the rear end of the socket. A second ferrule carrier is connected through the plug assembly. As the socket receives the plug assembly, doors on the respective housings open and the first and second ferrule carriers mate. Standard MT (Mechanical Transfer) ferrule carriers are utilized. The socket retains the fibers of the first ferrule carrier at a fixed position. The plug assembly has a movable front end which permits the fibers from the second ferrule carrier to move in the Z-Axis only. The invention provides an extremely compact high density optical interconnect that is dynamic in the cable exit area while retaining a robust and small bend radius cable exit.

These and other objects of the invention, as well as many of the intended advantages thereof, will become more readily apparent when reference is made to the following description, taken in conjunction with the accompanying drawings.

BRIEF DESCRIPTION OF THE FIGURES

FIG. 1 is a perspective view of the connector assembly in accordance with the preferred embodiment of the invention.

FIG. 2 is a perspective side view of a ferrule carrier used in the connector assembly of FIG. 1.

FIG. 3 is a perspective view of the cable assembly used in the connector assembly of FIG. 1.

FIG. 4 is a perspective view of the plug assembly with the cable assembly rotated in the horizontal and vertical directions.

FIG. 7 is a view of the cable assembly used in the connector assembly of FIG. 1.

FIG. 8 is a view of the inside of the plug cover and plug base of the plug assembly of FIG. 5.

FIG. 9 is a view of the outside of the plug cover and plug base of the plug assembly of FIG. 5.

FIG. 10(*b*) is an exploded bottom view of the plug core of FIG. 5.

FIG. 16 is a front perspective view of the plug assembly of FIG. 1, fully assembled without a dust cover and ready to be plugged into the socket.

FIG. 17 is a view of the face plate of the plug core.

FIG. 19 is an exploded view of the socket assembly used in the connector assembly of FIG. 1.

FIG. 23 is a view of he inner socket assembly.

FIG. 24 is a front view of the socket assembly with the door in the open position.

FIG. 25 is a view of the socket having a dust cover.

FIG. 27 shows the plug assembly having a dust cover.

DETAILED DESCRIPTION OF THE PREFERRED EMBODIMENTS

Figure 5:
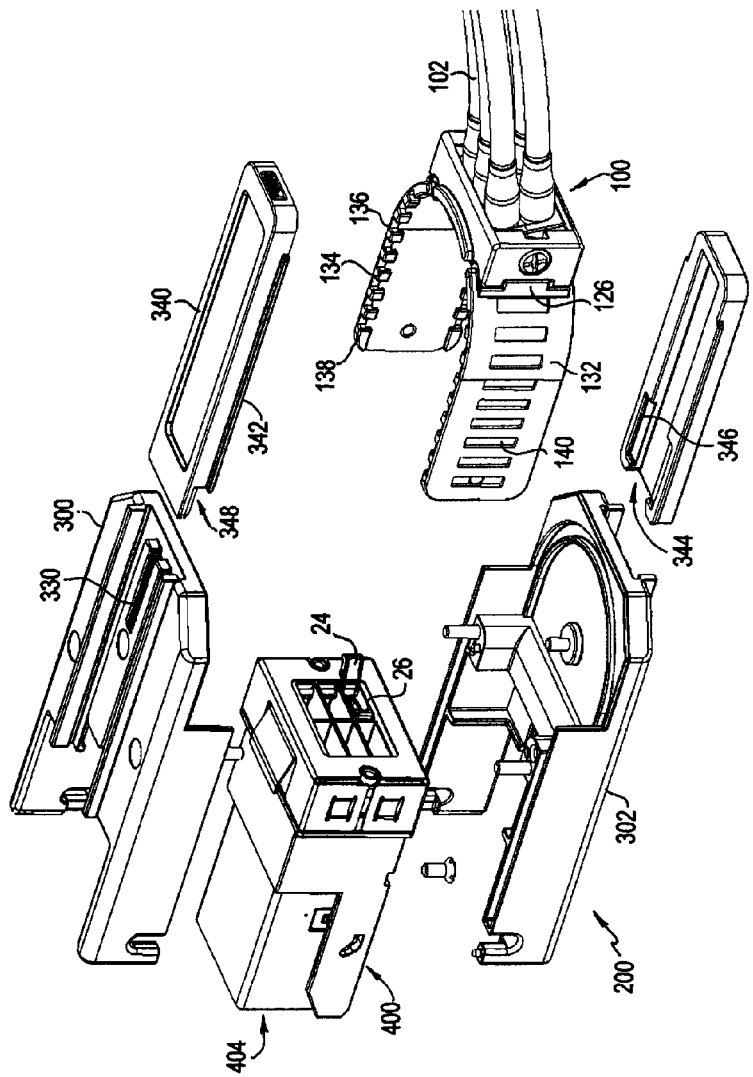
FIG. 5 is an exploded view of the plug assembly used in the connector assembly of FIG. 1.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. In addition, it should be understood that the directions referred to here are with respect to the embodiments shown in the figures for ease of description. For instance, the terms "vertical," "horizontal," "x-direction," "y-direction," "z-axis," "left," "right," "top," "bottom," and "side" are not intended to be limiting to the invention.

Turning to the drawings, FIG. 1 shows the connector assembly 10 in accordance with a preferred embodiment of the invention. As shown, the connector assembly 10 includes a cable assembly 100, plug assembly 200 and a socket assembly 500. The socket assembly 500 is a female member which is received within an opening at the front face of a panel 2, which can be a front or back panel. The plug assembly 200 is a male member which then engages the socket 500 at the front face of the panel 2. The cable assembly 100 connects the cables 102 carrying optical fibers to the plug assembly 200.

A ferrule carrier 20 (FIG. 2) is connected through the rear end (toward the upper right in the embodiment of FIG. 1) of the plug assembly 200. The ferrule carrier 20 has a flat ribbon with 12 or 24 optical fibers which extend out of the leading face 22 of the carrier 20. A standard MT (Mechanical Transfer) ferrule carrier can be utilized. The leading face 22 (FIG. 2) of the ferrule carrier 20 is fixedly fitted within the plug assembly 20. As best shown in FIG. 5, the latch or handle 24 and the guide 26 (FIG. 2) removably engage the carrier 20 to openings within the plug assembly 20. The optical fibers 8 then extend individually from the leading face 22 of the carrier 20 within the interior space of the plug assembly 200, to the cable assembly 100.

Figure 6:
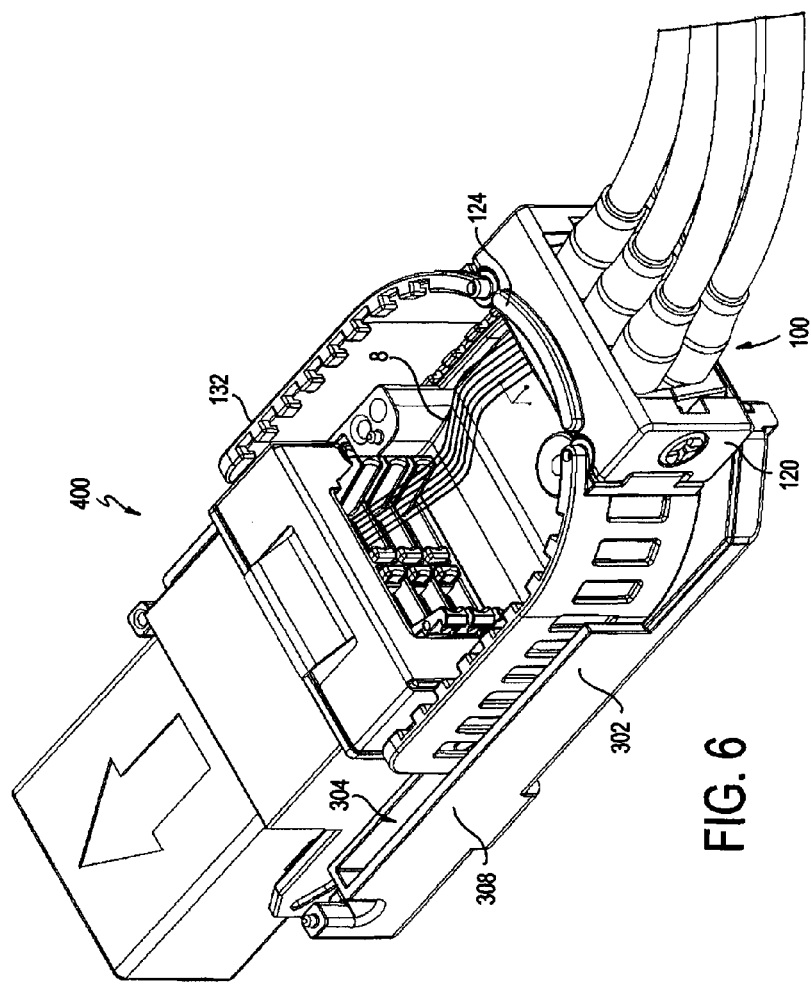
FIG. 6 is a perspective view of the plug assembly with the cover removed to show the internal features of the plug assembly.
Figure 10B:
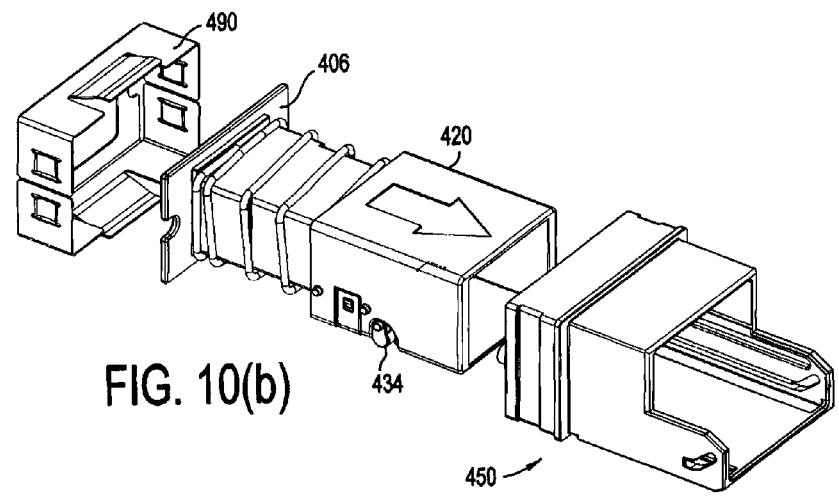
FIG. 10(*a*) is a front perspective view of the plug core of FIG. 5.

Accordingly, the fibers from the cables 102 extend into the plug assembly 200 and into the ferrule carrier 20 positioned in the plug core 400 (FIG. 6). The ferrule carrier 20 extends through the plug core 400 to the front end 404 of the plug core 400. The ferrule carriers 20 are retained within windows 410 that extend within an inner plug assembly 420 (FIG. 11) of the plug core 400 (FIG. 10(b)).

In addition, the socket assembly 500 receives a second ferrule carrier. The socket assembly 500 has an inner socket assembly 550 (FIGS. 19, 23) which is identical to the inner plug assembly 420. The respective face plates 406, 552, face away from each other, so that the front ends 404, 553 face each other. When the plug assembly 200 is received by the socket assembly 200, the inner plug assembly 420 abuts with the inner socket assembly 550. As the plug assembly 200 continues to be pressed into the socket assembly 550, the doors 434, 560 open. The ferrule carriers continue to come together and final alignment is made by the respective alignment pins on the ferrule carriers 20 (FIG. 2). The ferrule carriers 20 in the plug assembly 200 then mate with the ferrule carriers 20 in the socket assembly 500.

A push button 340 (FIG. 5) is provided on the plug assembly 200, so that the plug assembly 200 can be removed from the socket assembly 500.

Cable Assembly 100

As shown in FIG. 3, the cable assembly 100 includes the cables 102 and a cable adapter 110. The cable adapter 110 has a retention device 112 and a housing 120. The individual fibers 8 from the ferrule carrier 20 extend into the cables 102. A cylindrical crimp ring (shown just behind 106 channel) is crimped to the crimp support 104 to support and secure the Kevlar which is contained just beneath the exterior cabling jacket 102. The crimp ring is crimped in place via a hand tool. Then a small cylinder of heat-shrink is placed over the crimp, Kevlar, and jacketing to dress the back end and provide added strain relief when bending.

The crimp support 104 has a reduced diameter backend to help retain the crimp ring 105 to the crimp support 104. The crimp ring 105 crimps over the top of the crimp support 104. The crimp support is then snapped into the open channel 106 of retention device 112 where it is then held securely in place. The retention device 112 has outwardly extending arms 114 that have channels in between which receive the depressed midsection 106 of the crimp support 104. Preferably, there are six channels in the retention device 112, three on top and three on the bottom. Each channel receives a single cable 102 and each cable 102 contains one or more fibers, and preferably 24 fibers each for a total fiber count of 144, so that there is one cable 102 for each ferrule carrier 20.

The sides of the retention device 112 are each provided with a pivot 116. Caps 119 are provided about the top and bottom of the retention device 112. The caps 119 are two half pieces that fit together and cover the retention device and pivot as a whole within the housing 120. The caps 119 prevent the cables 102 from unsnapping once they are installed. The housing 120 has slots 122 (FIGS. 1, 4) which receive the pivots 116 (the housing 120 is not shown in the embodiment of FIG. 3 so that the arms 114 can be illustrated). A screw is passed through an opening in the sides of the housing 120 and into the pivot 116 to retain the device and prevent the device 112 from inadvertently coming free from the housing 120. Furthermore, the screws when secured in the pivots are intended to carry the load of someone pulling on the cabling. The forces are directly transferred to the connector body and not to the carriers holding the MT's, which could otherwise damage the carrier and disrupt the optical signal.

The pivot 116 diameter is utilized to control the rotation within the body 120 shown in FIG. 6. The screw is tightened and it seats on the head of the pivot 116 and not the housing 120. In this way the screws are free to rotate inside of the housing 120 when assembled. The cables 102 can then flex up and down with respect to the housing 120, which provides more routing freedom. By the retention device 112 pivoting up and down in the housing 120, the cables from individual connectors can be alternated and routed along the edge of a card. In other words, if eight connectors are in line on one card, then eight cables 102 would need to be stacked one on top of another where they exit toward the sides. By allowing for the tilt, now four cables can be stacked in the Up position and four can be stacked in the Down position, which makes the faceplate cable routing cleaner and more user friendly.

The plug assembly 200 provides a rotatable connection between the optical fibers 8 as they are carried by the ferrule carrier 20 and as they are carried by the cables 102. In the embodiment of FIG. 1, the cables 102 are shown engaged with the plug 200 so that a longitudinal axis of the cables 102 at the retention device 110 is generally perpendicular to the front face of the panel 2. However, the cable assembly 100 can be rotated 90° horizontally in the direction designated by arrow 4 (i.e., to the left and right or X-direction in the embodiment of FIG. 1), so that the longitudinal axis of the cables 102 can be up to about a 45° angle with respect to the front face of the panel 2 in either direction (see FIG. 18). Left and right movement means that the connector design is not driving the cable routing architecture for the system. It is free to route in either direction. Additionally, the cables 102 may exit straight from the backend of the plug which is desirable when pulling the connector through the ductwork during an install.

In addition, the cables 102 are pivotable within the cable assembly 100 in a vertical direction, as indicated by the arrow 6 (i.e., up and down or Y-direction in the embodiment of FIG. 1). Accordingly, the cables 102 can move approximately 90° in the horizontal direction, and about 60° in the vertical direction, with respect to the front face of the panel 2 and the leading face 22 of the ferrule carrier 20. Internally the fibers are routed so that there is a cross over of fiber cabling that allows for the required "Extra Slack" to prevent breaking the fibers during dynamic motion. Also, this movement minimizes fiber twisting during routing since the fibers are generally unconstrained. In addition, the fibers are somewhat free to rotate within the cable jacket 102, which also eases the strain and prevents fiber breakage.

However, once installed it is desirable to secure the six exiting cables to prevent rotational movement within the cable assembly. In this way, the fibers will not be damaged were someone to inadvertently twist the cable bundle. To do this, a short piece of adhesive tubing (not shown) is used at both the top and bottom of the six cables to secure the six cables as a group. This keeps the central portion free to flex and bend while protecting the assembly as a unit.

Slider Assembly 130

Referring to FIG. 7, the slider assembly 130 is shown in greater detail. The slider assembly 130 includes elongated belts 132 which are secured to the cable assembly housing 120. A curved slide projection 124 is provided at the top and bottom of the housing 120, so that the cable assembly 100 can also slide within the plug assembly 200 without coming free.

The belts 132 are relatively flexible so that they can bend as they slide within the grooves of the plug base 302 and cover 300 (FIGS. 5, 6). The belts 132 are plastic with a sheet metal backing 139 which operate as Electromagnetic Interference (EMI)/Radio Frequency Interference (RFI) barriers that prevent unwanted disturbances from affecting the signals carried on the fibers 8. The belts 132 also prevent RFI and EMI from escaping the plug assembly 200 and disrupting nearby signals. The belts 132 surround the front end of the plug assembly 200 and extend from the cable assembly 100 to the plug core 400 to maximize the shielding. The plug cover 300 and plug base 302 provide further shielding and couple to the socket when assembled to provide a positive ground.

The belts 132 have retention teeth 134 positioned at the top and bottom of the belts 132. The teeth 134 are separated by gaps 136 which are present to allow for bending during rotation. The teeth 134 project inwardly from the inside face of the belts 132 to provide retention for the sheet metal backings 139. Thus, in the embodiment of FIG. 7, the top teeth 134 extend downwardly and the bottom teeth 134 extend upwardly forming an internal channel to receive the backing 139. Window slots 140 are formed in the outside face of the belts 132 for aesthetics and to increase flexibility. The belts 132 are attached to the cable assembly housing 120 by pins 144 which attach to cylindrical holders at the end of the inner sheet metal 139 and extend into fittings having holes that are positioned in the housing 120. The pins 144 and fittings permit the belts 132 to flex with respect to the housing 120. The end 126 of the belt 132 projects into the cable housing 120 to provide a seal and prevent dust and debris from entering the plug assembly 200.

The belts 132 are preferably formed of two pieces, a flexible thin metal sheet 130 that forms the interior surface and provides the EMI/RFI shielding, and a flexible thin plastic sheet which forms the exterior surface. The exterior plastic sheet forms the teeth 134 and the slots 140. A projection 142 is provided on the inner backing sheet metal 139 such that once the sheet metal is inserted into place, the projection snaps into the exterior window frame and holds it there so the user may assemble the tread to housing 120 with the pin 144.

Plug Assembly 200

Turning to FIGS. 5 and 6, the plug assembly 200 of FIG. 1 is shown in greater detail. In FIG. 5, the plug assembly 200 is shown in an exploded view, and in FIG. 6 the plug assembly 200 is shown assembled with the plug cover 300 removed to show the interior space of the plug assembly 200. As shown in those figures, the plug assembly 200 brings together a number of components, including a plug cover 300, plug base 302, plug core 400, the cable assembly 100, and a slider assembly 130. The plug cover 300 and plug base 302 provide a platform for the plug core 400 to remain in an fixed position, while at the same time allowing the cable assembly 100 to be movable in a horizontal and vertical position with respect to the plug core 400. Thus, the cables 102 move horizontally and vertically with respect to the fibers 8 positioned within the ferrule carrier 20, which are contained within the plug core 400.

In the preferred embodiment shown in FIG. 5, the plug core 400 has six windows, each of which receives a ferrule carrier 20. Each ferrule carrier 20 can have anywhere from 2 to 24 fibers, and the fibers 8 from each carrier 20 are then contained in one of the cables 102. Thus, the plug assembly 200 has the capacity to handle the 24 fibers from six carriers 20, or up to 144 fibers.

Plug Cover 300 and Plug Base 302

FIGS. 8 and 9 show the plug cover 300 and plug base 302 of FIGS. 5 and 6 in greater detail. Turning first to FIG. 8, the inside of the cover 300 is shown. A curved track or groove 304 is formed at the back end of the cover 300 between an inside rail 306 and an outside rail 307. The inside and outside rails 306 and 307 are raised with respect to the surface of the cover 300. The groove 304 is substantially a half circle that extends out into the legs 310 of the cover 300. The outside rail 307 terminates at the side wall 308 of the cover 300, and the inner rail 306 terminates at an inner wall, at which point the side wall 308 and an inner wall form the groove 304. Thus, the groove 304 extends substantially along the outer boundary of the cover 300.

As shown in FIG. 6, the belts 132 are slidably engaged with the groove 304. The teeth 134 push against the inner rail 306 to provide spacing for easy movement of the belts 132, as well as to provide depth and stability to the belts 132. Thus, the belts 132 slide freely within the groove 304. In the embodiment of FIG. 6, the cable assembly 100 is placed into the groove 304 and centered on the rear of the cover or base. In this position, the belts 132 have excess space in the legs 310 with which to advance when the cable assembly 100 is rotated. Accordingly, that space allows the belts 132 to move to either side. The back end of the side wall 308 also operates as a stop to engage the cable assembly housing 120 and prevent further movement of the belts 132. This, in turn, prevents the ends of the belt 132 from moving beyond the end of the side wall 308 and possibly coming free of the groove 304.

As shown, the cable assembly 100 can move approximately 45° in either direction, for a full range of movement of about 90°. It should be noted, however, that any suitable range of motion can be provided, greater or less than the 90° horizontal movement or 60° vertical movement.

The cover 300 has two posts 314, one in the front and one in the middle-rear. Since the cover 300 and base 302 are identical the posts 314 will align in the respective holes (not shown) when the cover is flipped onto the base. The posts 314 and respective holes align the cover 300 with the base 302, and also lend stability to the cover and base 300, 302 so they do not rotate or shift side to side. In addition, the cover 300 has four holes 316, two are blind and two are through a through hole 318. All receive a screw or other fastener that passes through respective holes in the base 302 to secure the cover 300 to the base 302. A window 309 supports the plug dust cover in FIG. 27, allowing the dust cover to be secured in place via dust cover latches (not shown).

Turning to FIG. 9, the exterior of the cover 300 is shown. Two rails 322 project upward from the surface of the cover 300. The rails 322 jut inwardly toward each other to form a ledge 323 which forms an overhang having a channel 325 underneath the ledge 323. A center island 324 is provided between the rails 322 which is raised from the surface of the cover 300, but is lower than the height of the rails 322. The center island 324 is a guide for the release mechanism and it's corresponding counterpart, that is fixed and not moveable once installed. The island 324 also provides material to house the release spring 330 that pushes back on the plug release button 340. The front end of the island 324 is forked to form two arms 326 with a slot 328 between the arms 326. A spring 330 (FIG. 5) is fixed within the slot 328 on one side of the plug only. The two front corners of the cover 300 are angled, so the cover 300 doesn't snag if it is being pulled back through ductwork during cable installation.

Referring to FIG. 5, a push button 340 is provided on the cover 300. The push button 340 has a slide 342 that extends out from the bottom sides of the button 340. The slide 342 enters the channel 325 and engages the ledge 323 of the rails 322. The button 340 has a center channel 344 which receives the center island 324 of the cover 300. The entry of the center channel 344 is angled to prevent stubbing of the center island 324 and align the center island 324 as it enters the center channel 344. The back lip of the center channel 344 engages the spring 330. Side notches 346 are provided at the front sides of the button 340, and a release engagement means 348 is provided at the front end of the button 340. A similar but shorter button 340 is provided on the base 302 to retain product information or the like. It is not spring loaded and not intended to move once inserted.

A stop member 315 is provided at about the middle of the cover 300. This stop is for the plug core 400. A cutout 312 is placed in front of the stop member 315. This opening 312 allows for the ramp 492 of clip 490 to protrude through the shell and secure the buttons 340 accordingly. The ramp 492 locks against the front face of the 346 side notches.

Plug Core 400

Referring to FIG. 5, the plug core 400 is sandwiched between the plug cover 300 and the plug base 302. The plug core 400 has a rear end 402 and a front end 404, Turning to FIGS. 10(*a*) and 10(*b*), the plug core 400 primarily comprises an inner plug assembly 420, an actuating member 450, internal door 434, and a single clip 490.

Figure 11:
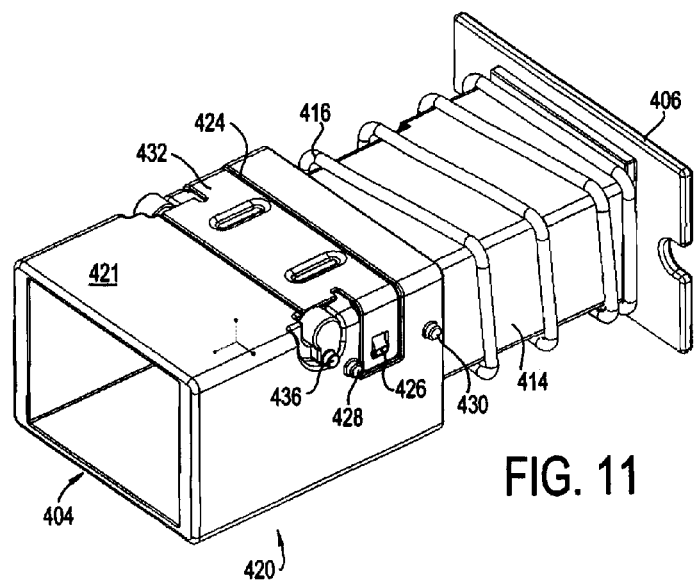
FIG. 11 shows the top view of the inner plug assembly of FIG. 10(*b*).
Figure 12:
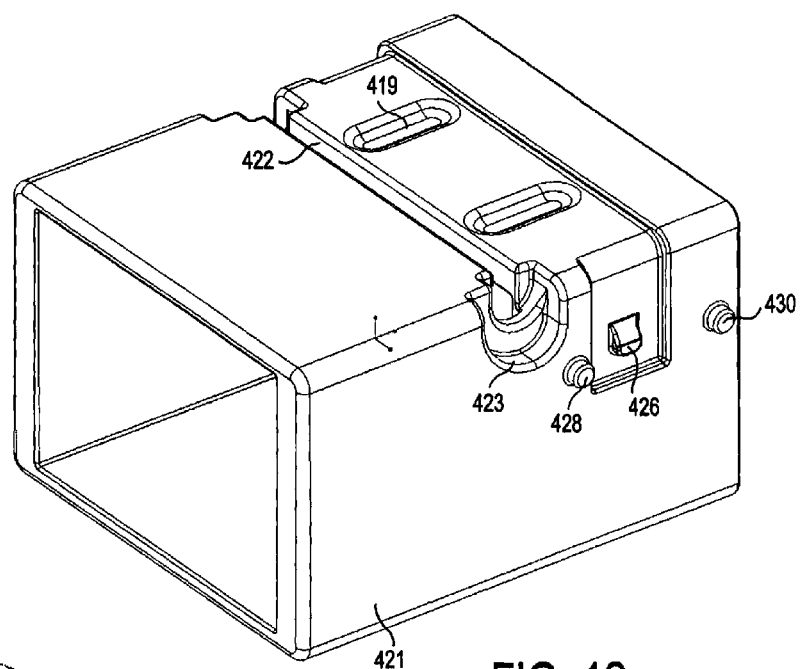
FIG. 12 is a perspective view of the main body of the inner plug assembly of FIG. 11 with the door removed.

The inner plug assembly 420 is shown in further detail in FIG. 11. The inner plug assembly 420 has a door housing 421, neck 414 connected to face plate 406. The door housing 421 is substantially rectangular in shape and cross-section. As shown in FIG. 12, the door housing 421 has a top, bottom, sides, and an opened front and rear. A depressed region 424 (not labeled) on FIG. 12 is formed at the top of the door housing 421 and extends slightly down over the two sides of the door housing 421. A through slot 422 is formed at one end of the depressed region 424. The slot 422 extends the entire width of the door housing 421 and has enlarged receiving sections 423 formed at each end of the slot 424. The slot 424 passes all the way through the top of the door housing 421.

Figure 13:
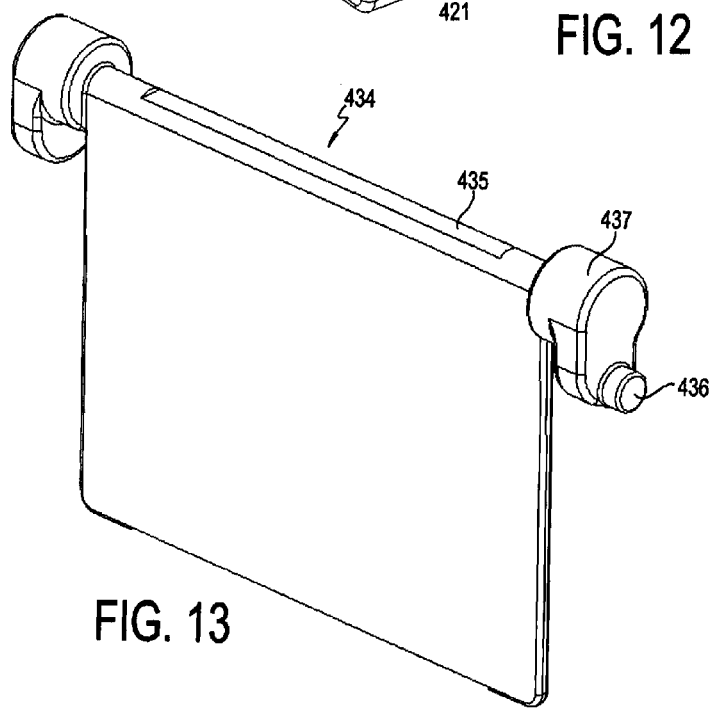
FIG. 13 is a front view of the door used in the inner plug assembly of FIG. 12.

The slot 424 receives the door 434, which is shown in FIG. 13. The door 434 has a pivot rod 435 formed at the top, with enlarged heads 437 at each end of the rod 435. The heads are elongated in the general shape of an oval. The center of the door 434 has a rough finish that reduces any back reflection of the laser optics as they shine against the door 434. A boss 436 projects outward from the side of the enlarged heads 437. The door 434 passes through the slot 422 of the door housing 421, and the heads 437 sit within the receiving sections 423 at the ends of the slot 422. The heads 437 are free to rotate within the receiving sections 423 and thereby the door 434 can move between an opened position and a closed position within the interior space of the door housing 421 by operation of the boss 436. The door is configured so that it always rotates away from the optics. There are two oval-shaped depressions 419 in the depressed region 424. The clip 432 has two reverse dimples that fit into the dimples on the door housing. These dimples in the clip 432 provide strength for the clip 432 and prevent the clip 432 from bending upward. The clip 432 provides the upper surface for the door and prevents it from coming out. Since it is cantilevered, the clip 432 requires added stiffness.

Returning to FIG. 11, a clip 432 is placed over the top of the rod 435 of the door 434 once the door 434 is positioned within the slot 422 of the door housing 421. The clip 432 sits within the depressed region (FIG. 12) of the door housing 421, and extends over the sides. The clip 432 has openings on the sides which mate with the tab 426 that extends outward from within the depressed region 424.

As further shown in FIG. 11, the inner plug assembly 420 also includes a neck 414 and a face plate 406. The face plate 406 is connected at one end of the neck 414 opposite the door housing 421. A spring 416 is positioned about the neck 414. One end of the spring 416 presses against the face plate 406, which prevents the spring 416 from coming off of the neck 414. The spring 416 fits under the housing 421 so that the other end of the spring 416 presses against an internal shelf within the door housing 421. Accordingly, the spring 416 biases the door housing 421 away from the face plate 406. In FIG. 11 the door is still free to rotate by 90 degrees and is not restricted. It is only restrained in movement once it enters actuating member 450.

Figure 14:
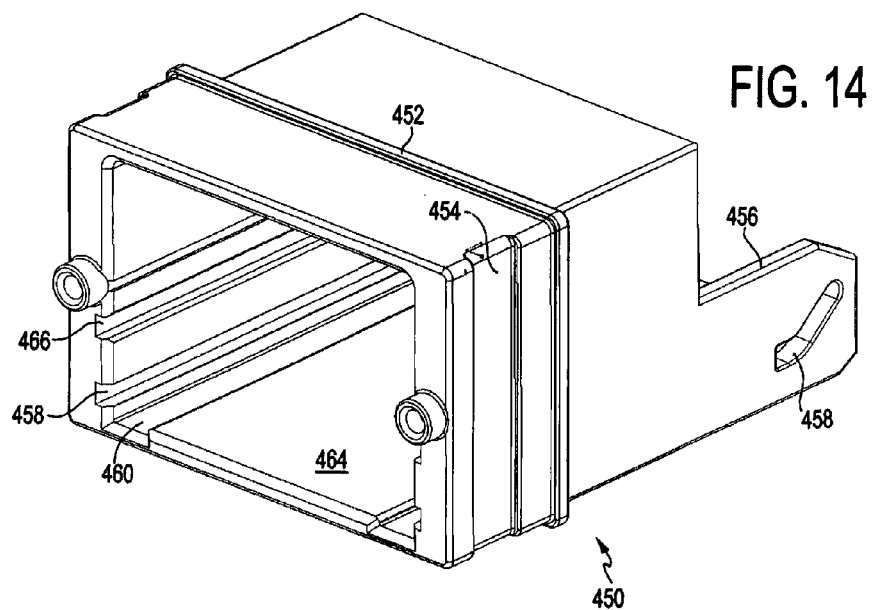
FIG. 14 is a front view of the actuating member of the plug core of FIG. 10(*a*).

Turning to FIG. 14, the actuating member 450 of FIGS. 10(*a*) and 10(*b*) is shown in further detail. The actuating member 450 generally has the shape of a rectangle, with arms 456 extending outward at the rear of the actuating member 450. These arms provide keying for the plug 200 into the socket 500 and provide material for the door 434 to move in it's full range of motion from open to closed. A curved guide slot 458 is positioned through each of the arms 456. A guide slot 452 both closes the door and opens the door when the spring or a mating force moves 420 into position.

A channel 454 is formed along the front of the sides of the actuating member 450. This channel 454 receives the locking clip 490. The top 464 of the actuating member 450 (which is shown upside-down in FIG. 14 for purposes of illustration) extends all the way to the end of the arms 456, as best shown in FIGS. 10(*a*) and 10(*b*). Clearance channels 460 are provided on the inside sides of actuating member 450. The rails 460 provided extra clearance for the heads 437 of the door 434 to be able to rotate freely with respect to the door housing 421.

Figure 15:
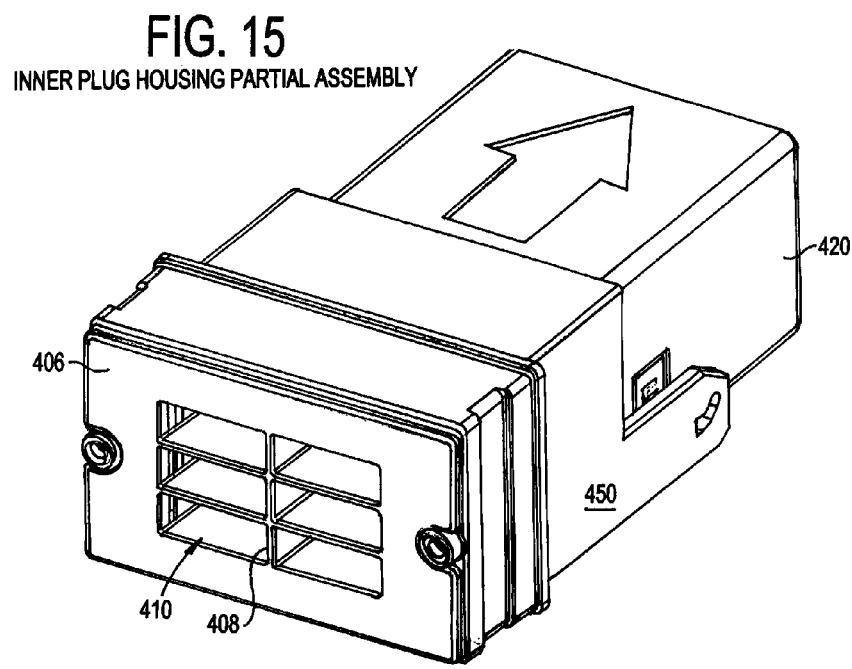
FIG. 15 shows the inner plug housing.

As best shown in FIG. 15, the door housing 421 (FIGS. 11, 12) is received in the interior opening of the actuating member 450. The face plate 406 rests against the rear of the actuating member 450. The face plate has a center which is formed as a sectioned divider 408 having windows 410. The windows 410 extend the entire length of the neck 414 of the inner plug assembly 420. In the embodiment of FIG. 15, there are six windows 410 formed by a central vertical divider that intersects two horizontal dividers. Circular fastening members receive screws to secure the face plate 406 of the inner plug assembly 420 to the actuating member 450. The head of the screw secures the face plate 06 to the actuating member 450. As the door housing 421 is inserted into the actuating member 450, the guide projections 428, 430 (FIG. 12) on the sides of the door housing 421 are received in the stabilizing channels 466 of the actuating member 450. The projections 428, 430 ride in the stabilizing channels 466 to align the door housing 421 with the actuating member 450. By having two projections 428, 430 spaced from one another, the projections 428, 430 also cooperate with the stabilizing channels 466 to stabilize the door housing 421 by preventing the door housing 421 from rocking within the actuating member 450.

At the same time, the boss 436 of the door 434 is received in the guide slot 458. The guide slot 458 sets the position of the doors rotation as the 420 moves forward and back within 450. In FIG. 15, the inner plug assembly 420 is shown assembled with the actuating member 450. In that embodiment, the spring 416 is expanded and the door 434 is closed. The body 420 is retained by the two cylindrical bosses which contain screws, where the screw head seats against the back of the faceplate 406 and threads into the actuating member 450. It should be noted, however, that the screws are optional; and the assembly can instead be staked by permanently displacing the cylindrical material into the two U-shaped channels 311 in the back plate (FIG. 8), so as to form an interference 'binding' fit.

As the plug 200 is joined with the socket 500, the socket 500 pushes on the inner plug assembly 420. The inner plug assembly 420 is pressed inward against the force of the spring 416 (FIG. 11). The bosses 436 ride within the guide slot 458. The end of the slot 458 is curved inward, which causes the door 434 to pivot to an open position. When the inner plug assembly 420 is pushed in far enough, the door 434 will open completely, permitting access to the ferrules. This keeps debris out of the inner plug assembly 420 and away from the ferrules.

Returning to FIG. 10(*a*), a locking feature 457 comprising a groove on the longer surface of the actuating member 450. The locking feature 457 extends into each arm 456 of the actuating member 450. On this same surface there is a slightly recessed area with respect to the outer surface which provides clearance for the socket 500. Clip 490 is positioned about the rear of the actuating member 450. The clip 490 is a thin sheet metal part that fully encases the rear of the actuating member 450. Retention members 493 are formed to provide a snap fit for the clip to the actuating member 450 so that it may be installed into the plug assembly without falling off or changing position.

Figure 22:
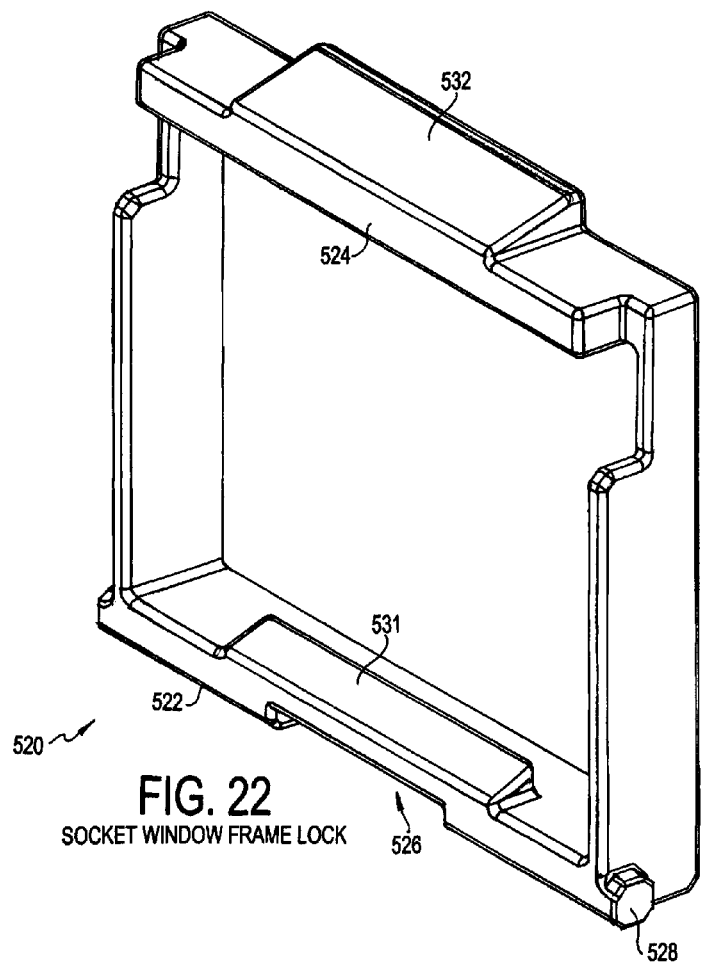
FIG. 22 is a view of the window frame used in the socket assembly of FIG. 29.

The two recessed features 457 lock into the ramp 531 (FIG. 22) and retain the plug into the socket 500. The recessed top 464 is provided so that the clip 530 which pushes the window frame 520 downward and against the plug can be somewhat recessed. The socket wall is thicker in that region below the clip, which then requires the recess 464 to be formed to clear that extra material. A spring ramp 492 is turned out from the outside surface of the clip 490 to extend out from the top and bottom of the actuating member 450. These ramps retain the buttons 340.

Referring to FIGS. 5, 6 and 8, the plug core 400 is joined with the plug cover 300 and the plug base 302. As shown in FIG. 6, the plug core 400 abuts up against the stop member 315. The latching features 313 retain the plug core from pulling out of the base and cover when decoupled from the socket.

Since the ramp 492 has its open end toward the front 404 of the core 400, the ramp 492 will press upward against the bottom of the button 340 until the notches 346 align with the ramp 492. The ramp 492 will then enter the notches 346. At that point, the spring 330 applies a force that pushes the button 340 rearward.

The assembled plug assembly 200 is shown in FIG. 16. As shown in FIG. 17, the ferrule carrier 20 is fitted in the windows 410 in the plug core 400. The handle 24 and color chip 26 extend through the windows 410, and the handle 24 latches onto the front face plate 406 of the actuator member 450. The ferrule carrier extends through the plug core 400 so that the leading face 22 (FIG. 2) of the ferrule carrier 20 is then present at the window at the front end 404 (FIG. 5) of the plug core 400. And, the individual fibers within the ferrule carrier 20 can enter the interior space of the plug assembly 200 and pass to the cables 102 without obstruction. Accordingly, the plug core 400 receives the ferrule carrier 20 at a rear end 402 and the ferrule carrier 20 extends through the length of the plug core 400 and ends just shy of the door such that the pins within the ferrules do not interact with the door and the door is free to close and seal.

The push button 340 should be stiff, and can be metal. The other button need not be stiff, and can be plastic. The nose 348 is a projecting release member that interacts with the exterior window frame ramp 532 (FIG. 19). When the push button 340 is forced forward by the user pressing against the exposed rear flat surface, and the interior button spring 330 is compressed, the nose 348 engages the exterior ramp 532 driving the window frame 520 downward (upward in FIG. 19) against the force of the clip tongue 532. This in turn releases the interior ramp 531 (FIG. 22) (locking tab) from the recesses 457 in the actuating member 450 FIG. 10(*a*)). The tongue 532 of the clip 530 provides a constant downward force against the window frame 520 in order to continuously bias the window frame 520 into the locked position. The tongue 532 resides in the recess 526 and 514 accordingly.

Figure 18B:
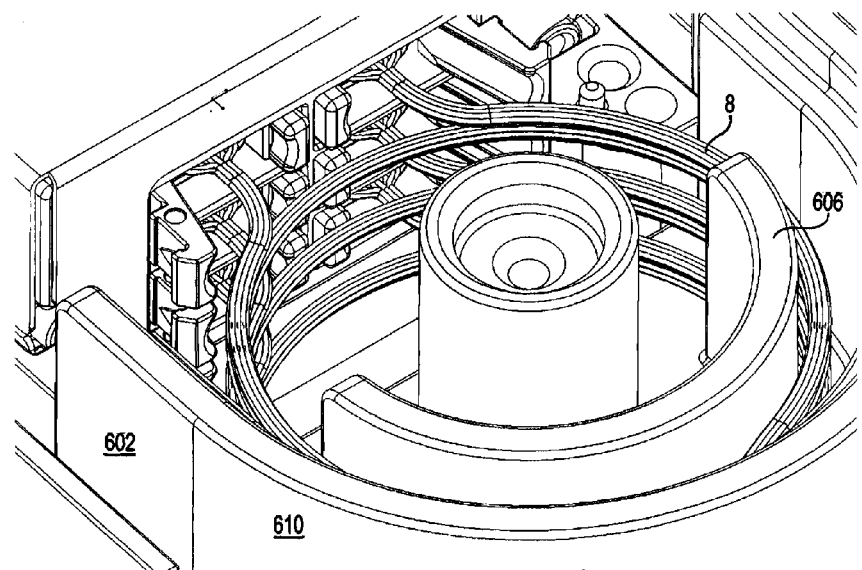
FIGS. 18(*a*) and 18(*b*) shows a loop back tray used in an alternative embodiment of the invention.

Diagnostic Tester (Loop Back) (FIG. 18)

FIGS. 18(*a*) and 18(*b*) show a plug assembly 600 in accordance with another embodiment of the invention. In the present embodiment, the plug assembly 600 is used to perform diagnostic testing. This is used to simulate a cable being plugged in so that the user can test how the system performs and responds. The plug core 400 is the same as in FIG. 5, but the cable assembly 100 is removed. A loop back tray 602 replaces the cable assembly 100 of FIG. 1 in order to seal the rear of the plug and provide an inner diameter for the fibers to loop around. The loop back tray 602 includes a central post 604 and an inner wall 606 which forms a track 608 with an outer wall 610.

As shown, the ferrule fibers 8 from one chamber exit and loop around the central post 604 within the track 608. The fibers 8 then return into the same chamber or an alternate chamber depending upon how the loop back needs to be configured for a given application. The ferrule carriers 20 can be arranged such that the carriers 20 entering the left three windows 410 of the plug core 400 carry transmit signals, and the ferrule carriers 20 entering the right three windows 410 carry receive signals. But the system is flexible enough that this may be arranged however the user chooses.

Center hole 318 rests in the center recess of the post 604 and allows for a screw to enter into the center threaded hole of the post 604 through the outside of the plug cover and base.

Socket Assembly 500

The socket assembly 500 of FIG. 1 is shown in further detail in FIG. 19. The socket assembly 500 includes a main socket body 501, an inner socket assembly, and a grounding sleeve.

Figure 20:
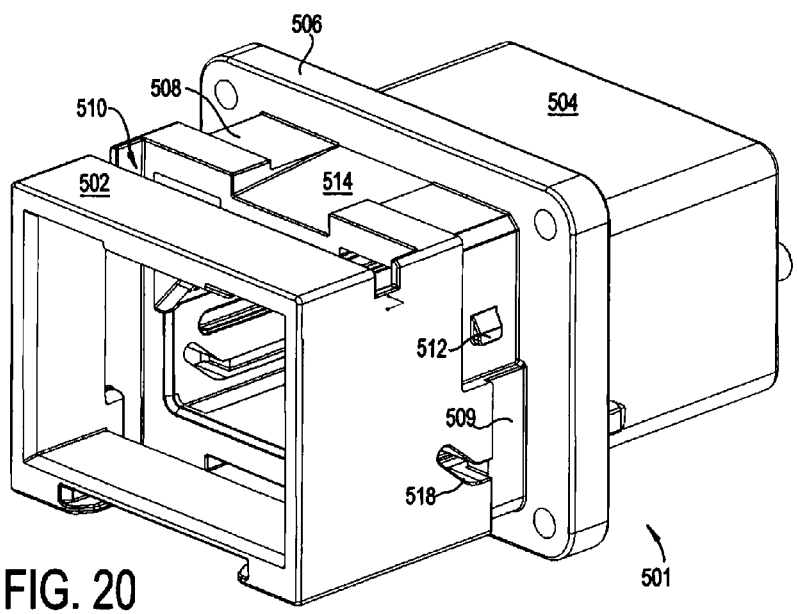
FIG. 20 is a perspective rear view of the main socket body used in the socket assembly of FIG. 19.
Figure 21:
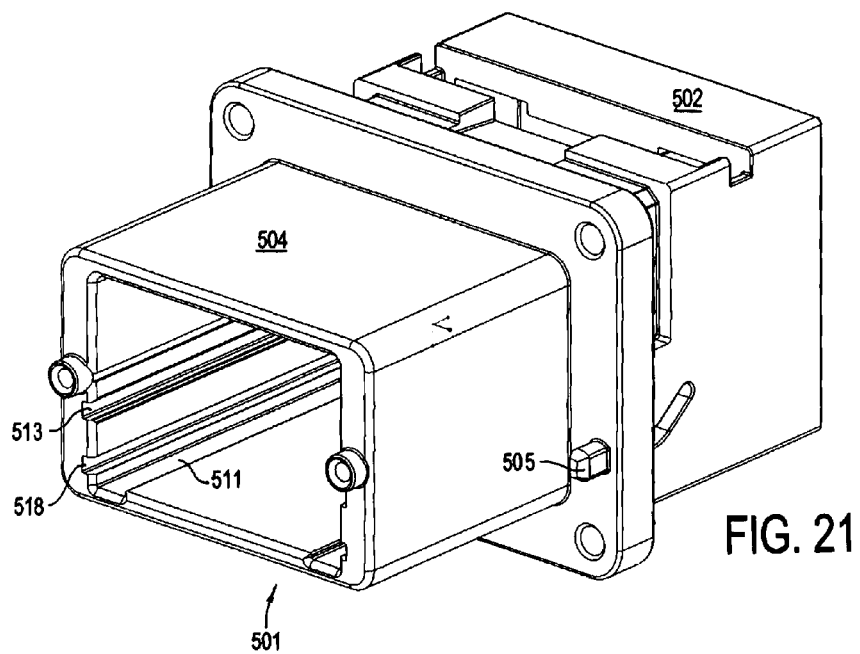
FIG. 21 is a perspective front view of the main socket body of FIG. 20.

The main socket body 501 is shown in FIGS. 20 and 21, where FIG. 20 shows a front view and FIG. 21 shows a rear view. The socket body 501 has a front end 502 and a rear end 504. An outwardly projecting divider 506 extends around the circumference of the body 501 at about the middle of the body 501 between the front and rear ends 502, 504. An opening 510 is formed at the top of the front end 502, and extends slightly down the sides of the body 501. A channel 508 is formed adjacent the divider 506 on the front end 502. The channel 508 extends to the sides of the socket body 501, and tabs 512 are formed within the sides of the channel 508. A sloped section 514 is contained between the recessed channel 508 and the opening 510. A guide slot 518 is provided in the side of the front end 502.

Four threaded openings are provided in the divider 506 that allow the socket assembly 500 to be fastened to the panel 2 by a screw or the like. A protrusion 503 is formed at the front end 502 at the opening 510 as a key to make sure that the window frame 520 is inserted into the opening 510 in the proper orientation. A key post 505 is formed in the face of the divider 506 to ensure proper orientation of the socket 500 and panel 2. A slight recess 509, which is not as deep as the channel 508, is positioned about the front end 502 adjacent the divider 506. The recess 509 extends around the bottom of the body 501 and part of the sides.

Returning to FIG. 19, the main socket body 501 receives a window frame locking member 520. With respect to the embodiment shown in FIG. 19, the frame 520 has a top 522 and a bottom 524, and a recess 526 is located on the top 522 of the frame 520. As shown in further detail in FIG. 22, a boss 528 is located on the sides at the top of the frame 520. An interior ramp 531 is provided at the interior at the top 522 of the frame 520 (the ramp 524 is inverted in FIG. 22 for purposes of illustration). An exterior ramp 532 is provided on the bottom 524 of the frame 520.

The frame 520 slides down into the opening 510. The bosses 528 engage the sides of the body 501 at the opening 510. The bosses 528 are the stops for the window frame 520 against the opening 510. A metal clip 530 is then placed into the channel 508 of the body 501. Openings in the sides of the clip 530 engage the tabs 512 in the channel 508 to lock the clip 530 to the body 501. The clip 530 has a tongue 532 which extends over the frame 520 and enters the recess 526 on the top 522 of the frame 520. The tongue 532 biases the frame into the locked position at all times and prevents the frame 520 from coming loose from the body 501. FIG. 24 shows the assembled socket assembly 500, with the frame 520 and clip 530 engaged in the front end 502 of the main socket body 501.

Turning to FIG. 23, the inner socket assembly 550 is shown. The inner socket assembly 550 is similar to the inner plug assembly 420 of FIGS. 11-13. Accordingly, the inner socket assembly 550 has a faceplate 552, body 554, neck 556, spring 558, door 560 and clip 562, as in the inner plug assembly 420. The faceplate 552 has a divider with windows which receive a ferrule carrier, as shown in FIG. 25. The windows extend substantially all the way through the neck 556. In addition, the main socket body housing 501 (FIG. 21) has rails 511 and channels 513, 518, which are similar to those of the actuating member 450 (FIG. 14) of the plug assembly 200. The rails 511 and channels 513, 518 operate the same way with respect to the door 560 and inner socket assembly 550, as the respective features of the actuating member 450 and plug assembly 200. The end of the channel 518 is curved inwardly (upward in the embodiment of FIG. 19). It extends through the body 501 for ease of manufacture.

Referring to FIG. 19, a gasket 575 is provided. As shown in FIG. 24, the gasket 575 is received in the recess 509. The gasket 575 abuts the divider 506 and partially covers the clip 530. As further shown in FIG. 1, the divider 506 contacts the panel 2 on the side of the panel 2 that receives the plug assembly 200. The gasket 575 is compressed against the plug when mated so that there is a ground path. Plus the gasket takes up any slop in the mating pairs so that there is no rattling under vibration. The divider 506 is the hard stop that sits against the faceplate and form a tight seal when screwed to the panel 2. When the plug is joined to the socket 500, the six ferrules on each side align and butt couple via the ferrule guide pin. Coming out of the back of the socket 500 are six individual ribbon fibers (composed of 12 or 24 fibers) that route to devices on a circuit card within the system.

The ground member 580 is the next component in the socket assembly 500 shown in FIG. 19. The ground member 580 is a thin metal component having metal grounding fingers 584 at its front end 582. The grounding fingers 584 are curved to have a bent shape which is raised outwardly to form a spring action. Each of the fingers 584 can move independent of one another. These fingers 584 provide an electrical ground for the connector 10, so that it is tied to the panel 2 and the socket 500 does not operate as a reflective antenna for signals within the box. Many fingers 584 are used so that it is very flexible and the feature size is small enough to block high frequency wavelengths. That shape permits the fingers 584 to press inwardly as it is inserted through the panel 2 opening thereby forming a line to line fit and grounding the assembly.

FIG. 25 shows the socket assembly 500 fully assembled and having a dust cap. A dust cap is also provided on the plug assembly 200, as shown in FIG. 27. The dust caps can be removed from the socket 500 and the plug assembly 200 just before they are connected together. The dust caps prevent dust from entering the socket assembly 500 and the plug assembly 200, and also prevents contamination of the fibers contained in those assemblies 500, 200 while not in use and as the assemblies 500, 200 are being assembled. Each dust cap has a round opening. The socket dust cap opening is there in case the user wants to install a loop to secure it to the panel for reuse. However, on the plug assembly 200, the loop is also provided so that the user can pull the connector assembly through ductwork when installing cabling in a facility. The dust cap has two set screws that secure it in place during installation then the screws are removed so the dust cap may be removed when needed.

Operation

Figure 26:
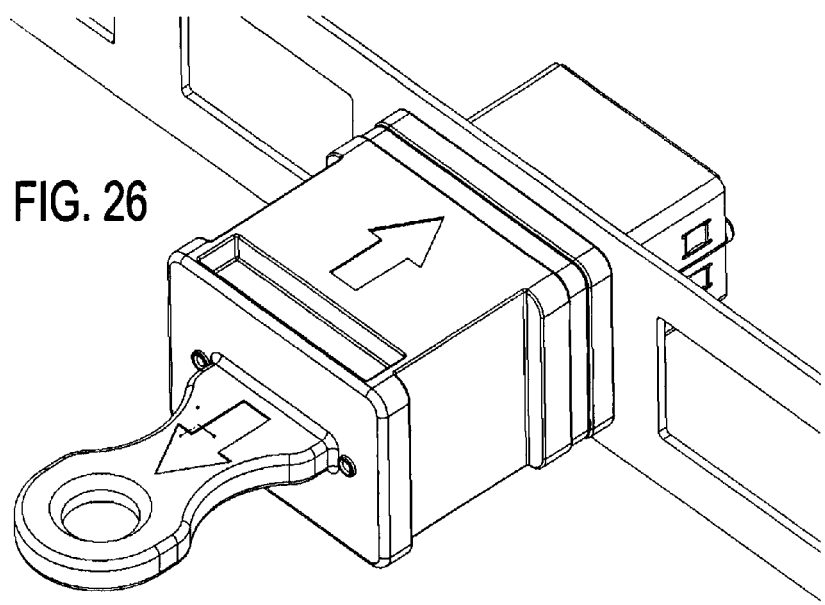
FIG. 26 shows the socket plugged into the panel with the dust cover.

The operation of the connector 10 will be described with reference to the various figures. The socket 500 is first inserted into the panel 2 and the dust cap is removed, FIGS. 1, 26. The plug assembly 200 is keyed so that it aligns to the socket 500. As the plug 200 and socket 500 come together, the window frame 520 (FIG. 19) lifts upward allowing the plug to fully seat. Once seated, the window 520 drops down and locks the plug 200 in place, thereby locking the plug assembly 200 to the socket assembly 500. During insertion, almost at the maximum of travel, the gasket 575 compresses and forms an additional dampening shield.

Internally, the two door housings 421, 554 (FIGS. 11, 23) make contact and begin to retract (i.e., move toward the faceplates 406, 552 against the action of the springs 416, 558). As they retract, the door bosses 428 ride in the appropriate slots 458, 518 (FIGS. 14, 21) of their respective mating parts and the doors 434 begin to rotate open exposing the inner ferrule carriers 20 with the fiber optics 8. Once the doors 434, 560 open, the necks 414, 556 slide over the respective opened doors 434, 560. The housing 421, 554 continues to slide onto the neck 414, 556 so that the leading face 22 of the ferrule carrier 20 (FIG. 2) is at the front end 404, 553 of the plug assembly 200 and socket assembly 500, respectively.

The guide pins in the ferrules 20 find the holes in the corresponding partner ferrule and align the fibers as the two assemblies make face-to-face ferrule contact. The ferrules 20 then compress by around 1 mm to insure that there is a constant force on the end face. The ferrules overtravel ever so slightly such that the window frame 520 can drop down and lock into place, at which time this is a very small springback.

The fibers come out of the MT ferrule as a ribbon then they fan out to individual loose fibers at the back of the carrier. These loose fibers then continue into the cable jacketing and go the length of the cable. The fibers are aligned because the MT ferrules hold them in precise position and the MT's mate ferrule to ferrule with precision alignment pins and holes. When the plug 200 is to be released from the socket 500, through operation of the button 340, the entire mechanism works in reverse. Plug 200 removes from socket 500 and each set of 6 MT ferrules decouple accordingly and are then hidden and protected by the connector doors. The doors close and the window frame 520 returns to its preloaded position.

The entire connector assembly 10 is almost all metal except for the one button, the plug dust cap and the side sliders. The entire assembly is robust and shielded. The metal parts are electroless nickel plated for diecast protection. It is strong and prevents from corrosion and abrasion. The parts could also be made of magnesium to reduce weight. The overall connector is designed with progressive alignment in mind, meaning that it progresses through various stages of crude gathering that gradually get finer and finer. The MT ferrules pins are the final alignment layer, and provide the precise (micron level) alignment of the fibers. The plug assembly 200 is roughly 1"×¾"× 3" long and the socket is roughly 1"×1"×2" long.

Overview

This design is unique in that it solves the problem of cable routing on the card face while still enabling the ability to readily pull the cabling through the ductwork. This is done with a device at the rear of the connector that provides a dynamic rear range of motion of 90 degree in the X direction and 30 degrees in the Y-direction. In addition by providing 6 individual crimped cables, the design allows for easier manufacturing and tighter bend radius control of the exiting cable mass since the cables are free to move and not constrained by an outer generally large thick jacket.

In addition, the connector 10 protects internal fibers while providing excellent EMI shielding and contamination protection. The connector 10 also provides a scalable solution as the optical requirements increase since users can start with lower density ferrules and upgrade to higher density ferrules while keeping the integrity of the architecture intact.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

I claim:

1. A connector assembly comprising:
    a socket assembly comprising:
        a main socket housing affixable within an opening of a panel; and
        an inner socket assembly having a socket body slidably received in said main socket housing, a socket neck slidably received in the socket body and having a front end, a socket faceplate connected to the socket neck, a socket spring extending around the socket neck, and a socket door pivotally connected to the socket body to open and close within the socket body, wherein the socket neck receives a first optical fiber having a mating face and retains the mating face of the first optical fiber at the front end of the socket neck;
    a plug assembly comprising:
        a main plug housing having a front end and a rear end, the rear end having a groove;
        a plug actuating member affixed at the front end of said main plug housing; and
        an inner plug assembly having a plug body slidably received in said plug actuating member, a plug neck slidably received in the plug body and having a front end, a plug faceplate connected to the plug neck, a plug spring extending around the plug neck, and a plug door pivotally connected to the plug body to open and close within the plug body, wherein the plug neck receives a second optical fiber having a mating face and retains the mating face of the second optical fiber at the front end of the plug neck, wherein the mating face of the first optical fiber mates with the mating face of the second optical fiber when said plug assembly is received in said socket assembly; and
    a cable assembly comprising:
        a cable housing;
        a crimp formed about the second optical fiber;
        a retention device receiving the crimp, the retention device pivotally connected to said cable housing; and
        an elongated slide member connected to said cable housing and slidably received in the groove of said main plug housing.

2. The connector assembly of claim 1, wherein said socket neck has a plurality of elongated socket windows which extend through said socket neck, each of said plurality of elongated socket windows receiving a ferrule carrier having a plurality of first optical fibers, and wherein said plug neck has a plurality of elongated plug windows which extend through said plug neck, each of said plurality of elongated plug windows receiving a ferrule carrier having a plurality of second optical fibers.

3. The connector assembly of claim 1, wherein said cable assembly is movable in a vertical direction with respect to the plug assembly.

4. The connector assembly of claim 1, wherein said cable assembly is movable in a horizontal direction with respect to the plug assembly.

5. The connector assembly of claim 1, wherein the socket door and plug door are closed when the plug assembly is not received by the socket assembly, and wherein the socket door and plug door open when the plug assembly is being received by the socket assembly.

6. The connector assembly of claim 1, wherein said plug assembly locks to said socket assembly when the plug assembly is received by said socket assembly.

7. The connector assembly of claim 6, said plug assembly further having a release mechanism for unlocking said plug assembly from said socket assembly.

8. A connector assembly comprising:
    a socket assembly having a front end and a rear end, the socket assembly receiving a first optical fiber having a mating face at the rear end and providing the mating face of the first optical fiber at the front end of the socket assembly;
    a plug assembly having a front end and a rear end, the plug assembly receiving a second optical fiber having a mating face at the rear end and providing the mating face of the second optical fiber at the front end of the plug assembly, wherein the mating face of the first optical fiber mates with the mating face of the second optical fiber when the plug assembly is received in the socket assembly; and
    a cable assembly movably connected at the rear end of said plug assembly, said cable assembly being movable with respect to the plug assembly and fixedly receiving the second optical fiber.

9. The connector assembly of claim 8, wherein said cable assembly is movable in both a vertical direction and a horizontal direction with respect to the plug assembly.

10. The connector assembly of claim 8, wherein said cable assembly is movable in a first direction and a second direction orthogonal to the first direction, with respect to the plug assembly.

11. The connector assembly of claim 8, wherein said socket assembly has a first door and said plug assembly has a second door, and wherein the first and second doors are closed when the plug assembly is not received by the socket assembly, and wherein the first and second doors open when the plug assembly is being received by the socket assembly.

12. The connector assembly of claim 8, wherein said plug assembly locks to said socket assembly when the plug assembly is received by said socket assembly.

13. The connector assembly of claim 12, said plug assembly further having a release mechanism for unlocking said plug assembly from said socket assembly.

14. A connector assembly comprising:
- a socket having a front end, the socket receiving a first ferrule carrier having a plurality of optical fibers and a mating face, and providing the mating face of the first optical fiber at the front end of the socket;
- a plug having a plug housing with a front end, a rear end, a top, and a bottom, said plug receiving a second ferrule carrier having a plurality of optical fibers and a mating face, and providing the mating face of the second optical fiber at the front end of the plug housing, wherein the mating face of the first ferrule carrier mates with the mating face of the second ferrule carrier when the plug is received in the socket, and further comprising a groove formed in the top and bottom at the rear end of the plug housing; and
- a cable assembly comprising:
  - a cable housing;
  - a crimp formed about the second optical fiber;
  - a retention device receiving the crimp, the retention device pivotally connected to said cable housing;
  - an elongated slide member connected to said cable housing and slidably received in the groove of said plug housing.

15. The connector assembly of claim 14, wherein said cable assembly is movable in a vertical direction with respect to the plug.

16. The connector assembly of claim 14, wherein said cable assembly is movable in a horizontal direction with respect to the plug.

17. The connector assembly of claim 14, wherein said plug locks to said socket when the plug is received by said socket.

18. The connector assembly of claim 17, said plug further having a release mechanism for unlocking said plug from said socket.

19. The connector assembly of claim 8, wherein the first optical fiber comprises a first plurality of optical fibers and the second optical fiber comprises a second plurality of optical fibers.

* * * * *